(12) United States Patent
Badam et al.

(10) Patent No.: US 10,061,366 B2
(45) Date of Patent: Aug. 28, 2018

(54) SCHEDULE-BASED ENERGY STORAGE DEVICE SELECTION

(71) Applicant: Microsoft Technology Licensing, LLC, Redmond, WA (US)

(72) Inventors: Anirudh Badam, Issaquah, WA (US); Ranveer Chandra, Bellevue, WA (US); Nissanka Arachchige Bodhi Priyantha, Redmond, WA (US); Jonathan Alan Dutra, Saratoga, CA (US); Julia L. Meinershagen, Seattle, WA (US); Stephen E. Hodges, Cambridge (GB); Thomas Moscibroda, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/943,967

(22) Filed: Nov. 17, 2015

(65) Prior Publication Data

US 2017/0139459 A1    May 18, 2017

(51) Int. Cl.
| G06F 1/26 | (2006.01) |
| G06F 1/28 | (2006.01) |
| G06F 1/32 | (2006.01) |

(52) U.S. Cl.
CPC .......... G06F 1/263 (2013.01); G06F 1/28 (2013.01); G06F 1/3212 (2013.01); Y02D 10/174 (2018.01)

(58) Field of Classification Search
CPC ...... G06F 1/3203; G06F 1/3212; G06F 1/329; G06F 1/263; G06F 1/28; G06F 1/1312;

(Continued)

(56) References Cited

U.S. PATENT DOCUMENTS

| 4,145,669 A | 3/1979 | Babcock et al. |
| 5,091,819 A | 2/1992 | Christensen et al. |

(Continued)

FOREIGN PATENT DOCUMENTS

| CN | 101714629 | 5/2010 |
| CN | 101834320 | 9/2010 |

(Continued)

OTHER PUBLICATIONS

"Second Written Opinion", Application No. PCT/US2015/026052, dated Mar. 29, 2016, 6 pages.

(Continued)

*Primary Examiner* — Terrell Johnson
(74) *Attorney, Agent, or Firm* — Schwegman Lundberg & Woessner, P.A.

(57) ABSTRACT

Schedule-based energy storage device selection is described for a device having an energy storage device system with heterogeneous energy storage devices, such as heterogeneous battery cells. The techniques discussed herein use information regarding a user's schedule (e.g., the user's calendar) to predict future workload patterns for a computing device and reserve energy storage device capacities across multiple heterogeneous energy storage devices to improve efficiency of the energy storage devices. For example, if a user is expected to attend a video conference call later in the day (e.g., due to the video conference call being on the user's calendar), then energy in an energy storage device that is better capable of handling such a workload (providing power during the video conference call) more efficiently is preserved so that the energy is available when the video conference call occurs.

20 Claims, 7 Drawing Sheets

(58) Field of Classification Search
CPC ........... H04W 52/0261; Y02B 60/1292; Y02B 60/144; Y02B 60/50; Y02D 10/174
See application file for complete search history.

(56) References Cited

U.S. PATENT DOCUMENTS

| | | | |
|---|---|---|---|
| 5,315,228 A | 5/1994 | Hess et al. |
| 5,519,261 A | 5/1996 | Stewart |
| 5,543,245 A | 8/1996 | Andrieu et al. |
| 5,614,332 A | 3/1997 | Pavelle et al. |
| 5,684,404 A | 11/1997 | Millar |
| 5,691,742 A | 11/1997 | O'Connor et al. |
| 5,693,010 A | 12/1997 | Hayashi et al. |
| 5,705,929 A | 1/1998 | Caravello et al. |
| 5,764,032 A | 6/1998 | Moore |
| 5,818,200 A | 10/1998 | Cummings et al. |
| 5,894,212 A | 4/1999 | Balogh |
| 5,914,585 A | 6/1999 | Grabon |
| 5,963,010 A | 10/1999 | Hayashi et al. |
| 6,139,987 A | 10/2000 | Koo et al. |
| 6,154,012 A | 11/2000 | Drori |
| 6,252,511 B1 | 6/2001 | Mondshine et al. |
| 6,258,473 B1 | 7/2001 | Spillman et al. |
| 6,268,711 B1 | 7/2001 | Bearfield |
| 6,299,998 B1 | 10/2001 | Morris et al. |
| 6,346,794 B1 | 2/2002 | Odaohhara |
| 6,353,304 B1 | 3/2002 | Atcitty et al. |
| 6,417,646 B1 | 7/2002 | Huykman et al. |
| 6,463,495 B1 | 10/2002 | Angelo et al. |
| 6,650,089 B1 | 11/2003 | Freeman et al. |
| 6,710,578 B1 | 3/2004 | Sklovsky |
| 6,771,044 B1 | 8/2004 | Vinciguerra et al. |
| 6,833,792 B1 | 12/2004 | Smith et al. |
| 6,847,191 B1 | 1/2005 | Wang |
| 6,920,404 B2 | 7/2005 | Yamanaka |
| RE38,918 E | 12/2005 | Svensson et al. |
| 6,977,479 B2 | 12/2005 | Hsu |
| 6,992,580 B2 | 1/2006 | Kotzin et al. |
| 7,015,596 B2 | 3/2006 | Pail |
| 7,020,500 B2 | 3/2006 | Saghbini |
| 7,059,769 B1 | 6/2006 | Potega |
| 7,193,334 B2 | 3/2007 | Hiramitsu et al. |
| 7,333,998 B2 | 2/2008 | Heckerman et al. |
| 7,339,348 B2 | 3/2008 | Bui et al. |
| 7,339,353 B1 | 3/2008 | Masias et al. |
| 7,383,451 B2 | 6/2008 | Matsushima et al. |
| 7,415,623 B2 | 8/2008 | Rapps et al. |
| 7,430,675 B2 | 9/2008 | Lee |
| 7,430,679 B2 | 9/2008 | Tevanian, Jr. |
| 7,475,267 B1 | 1/2009 | Cocosel |
| 7,531,989 B2 | 5/2009 | Maireanu |
| 7,574,661 B2 | 8/2009 | Matsuura et al. |
| 7,583,951 B2 | 9/2009 | Gibbs |
| 7,684,942 B2 | 3/2010 | Yun et al. |
| 7,716,500 B2 | 5/2010 | Esliger |
| 7,734,317 B2 | 6/2010 | Patel et al. |
| 7,787,405 B2 | 8/2010 | Dettinger et al. |
| 7,814,348 B2 | 10/2010 | Krajcovic et al. |
| 7,839,121 B2 | 11/2010 | Kim |
| 7,944,662 B2 | 5/2011 | Carkner et al. |
| 8,001,400 B2 | 8/2011 | Fadell |
| 8,001,407 B2 | 8/2011 | Malone et al. |
| 8,032,317 B2 | 10/2011 | Houston et al. |
| 8,063,606 B2 | 11/2011 | Veselic |
| 8,097,355 B2 | 1/2012 | Larsen |
| 8,138,726 B2 | 3/2012 | Partin et al. |
| 8,255,716 B2 | 8/2012 | Mandyam |
| 8,258,748 B2 | 9/2012 | Constien et al. |
| 8,313,864 B2 | 11/2012 | Christensen et al. |
| 8,330,419 B2 | 12/2012 | Kim et al. |
| 8,369,904 B2 | 2/2013 | Bennis et al. |
| 8,386,816 B2 | 2/2013 | Elsilä et al. |
| 8,386,826 B2 | 2/2013 | Newman |
| 8,405,332 B1 | 3/2013 | Krishnamoorthy et al. |
| 8,423,306 B2 | 4/2013 | Duncan |
| 8,427,106 B2 | 4/2013 | Kim et al. |
| 8,456,136 B2 | 6/2013 | Kim et al. |
| 8,471,521 B2 | 6/2013 | Stewart et al. |
| 8,482,254 B2 | 7/2013 | Ho |
| 8,487,473 B2 | 7/2013 | Peterson et al. |
| 8,508,191 B2 | 8/2013 | Kim et al. |
| 8,538,686 B2 | 9/2013 | Gruen et al. |
| 8,594,648 B2 | 11/2013 | Musial et al. |
| 8,598,838 B2 | 12/2013 | Cunico |
| 8,598,849 B2 | 12/2013 | Bhardwaj et al. |
| 8,607,036 B2 | 12/2013 | More et al. |
| 8,624,560 B2 | 1/2014 | Ungar et al. |
| 8,629,652 B2 | 1/2014 | Partovi et al. |
| 8,648,493 B2 | 2/2014 | Park |
| 8,648,567 B2 | 2/2014 | Hoffman |
| 8,665,214 B2 | 3/2014 | Forutanpour et al. |
| 8,686,693 B2 | 4/2014 | Bhowmik et al. |
| 8,732,487 B2 | 5/2014 | Goraczko et al. |
| 8,749,193 B1 | 6/2014 | Sullivan |
| 8,751,845 B2 | 6/2014 | Assad et al. |
| 8,768,567 B2 | 7/2014 | Diab |
| 8,795,875 B2 | 8/2014 | Lee et al. |
| 8,803,479 B2 | 8/2014 | Kim |
| 8,805,764 B1 | 8/2014 | Rhines et al. |
| 8,829,847 B2 | 9/2014 | Eaton et al. |
| 8,833,667 B2 | 9/2014 | Ahn et al. |
| 8,847,551 B2 | 9/2014 | Coe et al. |
| 8,898,485 B2 | 11/2014 | Scott et al. |
| 8,922,329 B2 | 12/2014 | Davis et al. |
| 8,949,629 B2 | 2/2015 | Chakra et al. |
| 8,958,854 B1 | 2/2015 | Morley et al. |
| 8,962,188 B2 | 2/2015 | Zhamu et al. |
| 9,285,851 B2 | 3/2016 | Hodges et al. |
| 9,475,398 B2 | 10/2016 | Borhan et al. |
| 9,696,782 B2 | 7/2017 | Chandra et al. |
| 9,748,765 B2 | 8/2017 | Huang et al. |
| 9,760,138 B2 | 9/2017 | Huang et al. |
| 9,793,570 B2 | 10/2017 | Chandra et al. |
| 9,939,862 B2 | 4/2018 | Badam et al. |
| 2001/0010456 A1 | 8/2001 | Kaite et al. |
| 2001/0013767 A1 | 8/2001 | Takemoto |
| 2001/0044332 A1 | 11/2001 | Yamada et al. |
| 2002/0155327 A1 | 10/2002 | Faris |
| 2003/0117143 A1 | 6/2003 | Okada |
| 2003/0149904 A1 | 8/2003 | Kim |
| 2004/0003300 A1 | 1/2004 | Malueg et al. |
| 2004/0095096 A1 | 5/2004 | Melton et al. |
| 2004/0101744 A1 | 5/2004 | Suzuki |
| 2004/0198468 A1 | 10/2004 | Patel et al. |
| 2004/0204183 A1 | 10/2004 | Lencevicius |
| 2005/0189949 A1 | 9/2005 | Shimizu et al. |
| 2005/0258686 A1 | 11/2005 | Hiramitsu et al. |
| 2006/0066285 A1 | 3/2006 | Minamiura |
| 2006/0087291 A1 | 4/2006 | Yamauchi |
| 2006/0176017 A1 | 8/2006 | Waguespack |
| 2006/0284618 A1 | 12/2006 | Cho et al. |
| 2007/0007823 A1 | 1/2007 | Huang et al. |
| 2007/0050647 A1 | 3/2007 | Conroy |
| 2007/0103114 A1 | 5/2007 | Hoffman |
| 2007/0252552 A1 | 11/2007 | Walrath |
| 2008/0024007 A1* | 1/2008 | Budampati ............... H02J 1/08 307/19 |
| 2008/0075367 A1 | 3/2008 | Winn et al. |
| 2008/0082851 A1 | 4/2008 | Zettler |
| 2008/0137989 A1 | 6/2008 | Ng et al. |
| 2008/0176608 A1* | 7/2008 | Budampati .......... H04B 1/1615 455/572 |
| 2008/0201587 A1* | 8/2008 | Lee ...................... G06F 1/3203 713/320 |
| 2008/0218125 A1 | 9/2008 | Bansal et al. |
| 2008/0234956 A1 | 9/2008 | Mizuno et al. |
| 2008/0263375 A1 | 10/2008 | Sundstrom et al. |
| 2009/0006878 A1 | 1/2009 | Borghetti et al. |
| 2009/0007128 A1 | 1/2009 | Borghetti et al. |
| 2009/0016765 A1 | 1/2009 | Honda |
| 2009/0018785 A1 | 1/2009 | Huseth et al. |
| 2009/0085553 A1 | 4/2009 | Kumar et al. |
| 2009/0295397 A1 | 12/2009 | Barsukov |
| 2010/0070334 A1 | 3/2010 | Monteverde |

(56) References Cited

U.S. PATENT DOCUMENTS

| | | |
|---|---|---|
| 2010/0106994 A1 | 4/2010 | Challener et al. |
| 2010/0121587 A1 | 5/2010 | Vian et al. |
| 2010/0121588 A1 | 5/2010 | Elder et al. |
| 2010/0123436 A1 | 5/2010 | Herrod et al. |
| 2010/0164430 A1 | 7/2010 | Lu et al. |
| 2010/0174928 A1 | 7/2010 | Borghetti et al. |
| 2010/0201320 A1 | 8/2010 | Coe et al. |
| 2010/0213897 A1 | 8/2010 | Tse |
| 2010/0235007 A1 | 9/2010 | Constein et al. |
| 2010/0304207 A1 | 12/2010 | Krammer |
| 2010/0332876 A1 | 12/2010 | Fields et al. |
| 2011/0016333 A1 | 1/2011 | Scott et al. |
| 2011/0018679 A1 | 1/2011 | Davis et al. |
| 2011/0025258 A1 | 2/2011 | Kim et al. |
| 2011/0025259 A1 | 2/2011 | Toya et al. |
| 2011/0057617 A1 | 3/2011 | Finberg et al. |
| 2011/0115830 A1 | 5/2011 | Lee et al. |
| 2011/0161690 A1 | 6/2011 | Lin et al. |
| 2011/0171502 A1 | 7/2011 | Kottenstette et al. |
| 2011/0181242 A1 | 7/2011 | Lee |
| 2011/0187309 A1 | 8/2011 | Chan et al. |
| 2011/0234166 A1 | 9/2011 | Liu |
| 2011/0250512 A1 | 10/2011 | Friesen et al. |
| 2011/0260686 A1 | 10/2011 | Ford |
| 2011/0264899 A1 | 10/2011 | Evans et al. |
| 2011/0309838 A1 | 12/2011 | Lin |
| 2012/0004875 A1 | 1/2012 | Maeda et al. |
| 2012/0018679 A1 | 1/2012 | Davis et al. |
| 2012/0040210 A1 | 2/2012 | Hermann |
| 2012/0046892 A1 | 2/2012 | Fink |
| 2012/0058805 A1 | 3/2012 | Yoo |
| 2012/0074893 A1 | 3/2012 | Cole |
| 2012/0098705 A1 | 4/2012 | Yost et al. |
| 2012/0102407 A1 | 4/2012 | Benario |
| 2012/0102504 A1 | 4/2012 | Iyer |
| 2012/0109519 A1 | 5/2012 | Uyeki |
| 2012/0119705 A1 | 5/2012 | Eberhard et al. |
| 2012/0119746 A1 | 5/2012 | Macris |
| 2012/0144215 A1 | 6/2012 | Naffziger et al. |
| 2012/0144221 A1 | 6/2012 | Naffziger et al. |
| 2012/0150247 A1 | 6/2012 | Meier et al. |
| 2012/0153899 A1 | 6/2012 | Marschalkowski et al. |
| 2012/0188714 A1* | 7/2012 | Von Borck .......... H01M 2/1061 361/688 |
| 2012/0309455 A1 | 12/2012 | Klose et al. |
| 2012/0319652 A1 | 12/2012 | Namou et al. |
| 2012/0324578 A1 | 12/2012 | Seinfeld et al. |
| 2012/0326671 A1 | 12/2012 | Krause |
| 2013/0009604 A1 | 1/2013 | Bhardwaj et al. |
| 2013/0038274 A1 | 2/2013 | Forsythe |
| 2013/0043827 A1 | 2/2013 | Weinstein et al. |
| 2013/0099746 A1 | 4/2013 | Nork et al. |
| 2013/0106357 A1 | 5/2013 | Girard et al. |
| 2013/0143100 A1 | 6/2013 | Bennis et al. |
| 2013/0162430 A1 | 6/2013 | Scherzer et al. |
| 2013/0181511 A1 | 7/2013 | Stewart et al. |
| 2013/0191625 A1 | 7/2013 | Mullens et al. |
| 2013/0191662 A1 | 7/2013 | Ingrassia, Jr. et al. |
| 2013/0221926 A1 | 8/2013 | Furtner |
| 2013/0226486 A1 | 8/2013 | Henderson et al. |
| 2013/0257377 A1 | 10/2013 | Diamond et al. |
| 2013/0262899 A1 | 10/2013 | Frantz et al. |
| 2013/0275794 A1 | 10/2013 | Annavaram et al. |
| 2013/0325379 A1 | 12/2013 | Nakamura |
| 2013/0346001 A1 | 12/2013 | Park et al. |
| 2013/0346762 A1 | 12/2013 | Hodges et al. |
| 2014/0015488 A1 | 1/2014 | Despesse |
| 2014/0021887 A1 | 1/2014 | Keily et al. |
| 2014/0038054 A1 | 2/2014 | Tojigamori et al. |
| 2014/0043010 A1 | 2/2014 | Salem |
| 2014/0062388 A1 | 3/2014 | Kim |
| 2014/0082384 A1 | 3/2014 | De Cesare et al. |
| 2014/0093779 A1 | 4/2014 | Myung et al. |
| 2014/0095003 A1 | 4/2014 | Phillips et al. |
| 2014/0125344 A1 | 5/2014 | Knight et al. |
| 2014/0155100 A1 | 6/2014 | Baldasare et al. |
| 2014/0162112 A1 | 6/2014 | Ugaji et al. |
| 2014/0181551 A1 | 6/2014 | Rahal-Arabi et al. |
| 2014/0186700 A1 | 7/2014 | Bae et al. |
| 2014/0191693 A1 | 7/2014 | Funaba et al. |
| 2014/0203780 A1 | 7/2014 | Hu et al. |
| 2014/0253023 A1 | 9/2014 | Paryani |
| 2014/0265604 A1 | 9/2014 | Mergener |
| 2014/0266061 A1 | 9/2014 | Wachal |
| 2014/0278074 A1 | 9/2014 | Annapureddy et al. |
| 2014/0288737 A1 | 9/2014 | Ryu et al. |
| 2014/0312828 A1 | 10/2014 | Vo et al. |
| 2014/0375252 A1 | 12/2014 | Ford |
| 2015/0004473 A1 | 1/2015 | Lim et al. |
| 2015/0020016 A1 | 1/2015 | Hanumara et al. |
| 2015/0084602 A1 | 3/2015 | Sawyers et al. |
| 2015/0089261 A1 | 3/2015 | Segawa et al. |
| 2015/0125743 A1 | 5/2015 | Edwards et al. |
| 2015/0188188 A1 | 7/2015 | Zhang et al. |
| 2015/0194707 A1 | 7/2015 | Park |
| 2015/0207344 A1 | 7/2015 | Wang et al. |
| 2015/0309547 A1 | 10/2015 | Huang et al. |
| 2015/0329003 A1* | 11/2015 | Li ..................... B60L 11/1816 320/134 |
| 2015/0339415 A1 | 11/2015 | Klein et al. |
| 2015/0351037 A1 | 12/2015 | Brown et al. |
| 2016/0114696 A1 | 4/2016 | Eifert et al. |
| 2016/0231387 A1 | 8/2016 | Hodges et al. |
| 2016/0231801 A1 | 8/2016 | Chandra et al. |
| 2016/0240891 A1 | 8/2016 | Hodges et al. |
| 2016/0241048 A1 | 8/2016 | Badam et al. |
| 2016/0248125 A1 | 8/2016 | Huang et al. |
| 2016/0248266 A1 | 8/2016 | Ferrese et al. |
| 2016/0254664 A1 | 9/2016 | Huang et al. |
| 2016/0275400 A1 | 9/2016 | Hodges et al. |
| 2017/0108906 A1 | 4/2017 | Chandra et al. |
| 2017/0139459 A1* | 5/2017 | Badam ..................... G06F 1/32 |
| 2017/0139465 A1 | 5/2017 | Badam |
| 2017/0162899 A1 | 6/2017 | Chandra et al. |
| 2017/0269670 A1 | 9/2017 | Chandra et al. |
| 2017/0317493 A1 | 11/2017 | Huang et al. |

FOREIGN PATENT DOCUMENTS

| | | |
|---|---|---|
| CN | 102230953 | 11/2011 |
| CN | 202424488 | 9/2012 |
| CN | 103226184 | 7/2013 |
| CN | 103683255 | 3/2014 |
| EP | 1798100 | 6/2007 |
| EP | 1906295 | 4/2008 |
| EP | 2296246 | 3/2011 |
| EP | 2590050 | 5/2013 |
| EP | 2682840 | 1/2014 |
| GB | 2446168 | 8/2008 |
| JP | H0410366 | 1/1992 |
| JP | H0684544 | 3/1994 |
| JP | 2009278754 | 11/2009 |
| JP | 2010067436 | 3/2010 |
| JP | 2012243463 | 12/2012 |
| KR | 20070095689 | 10/2007 |
| KR | 20090064813 | 6/2009 |
| KR | 20140140906 | 12/2014 |
| WO | WO-9401914 | 1/1994 |
| WO | WO-9933124 | 7/1999 |
| WO | WO-03021409 | 3/2003 |
| WO | WO-2007127788 | 11/2007 |
| WO | WO-2008133951 | 11/2008 |
| WO | WO-2011127251 | 10/2011 |
| WO | WO-2012109048 | 8/2012 |
| WO | WO-2012140401 | 10/2012 |
| WO | WO-2013019899 | 2/2013 |
| WO | WO-2013052678 | 4/2013 |
| WO | WO-2013060802 | 5/2013 |
| WO | WO-2013145000 | 10/2013 |
| WO | WO-2013163695 | 11/2013 |
| WO | WO-2014098037 | 6/2014 |
| WO | WO-2015029332 | 3/2015 |

(56) References Cited

FOREIGN PATENT DOCUMENTS

| WO | WO-2015123290 | 8/2015 |
|---|---|---|
| WO | WO-2016149702 | 9/2016 |
| WO | WO-2016197109 | 12/2016 |

OTHER PUBLICATIONS

"International Search Report and Written Opinion", Application No. PCT/US2016/016670, dated Sep. 14, 2016, 23 pages.
"International Search Report and Written Opinion", Application No. PCT/US2016/016669, dated Sep. 30, 2016, 24 pages.
"Non-Final Office Action", U.S. Appl. No. 14/617,719, dated Aug. 22, 2016, 9 pages.
"Non-Final Office Action", U.S. Appl. No. 14/617,751, dated Aug. 25, 2016, 10 pages.
"Non-Final Office Action", U.S. Appl. No. 14/885,858, dated Oct. 7, 2016, 18 pages.
"Second Written Opinion", Application No. PCT/US2016/015493, dated Jul. 28, 2016, 5 pages.
"Second Written Opinion", Application No. PCT/US2016/016037, dated Sep. 1, 2016, 5 pages.
"International Preliminary Report on Patentability", Application No. PCT/US2016/016033, dated Nov. 7, 2016, 6 pages.
"International Preliminary Report on Patentability", Application No. PCT/US2015/026052, dated Jul. 27, 2016, 8 pages.
"Non-Final Office Action", U.S. Appl. No. 14/624,825, dated Nov. 18, 2016, 33 pages.
"Non-Final Office Action", U.S. Appl. No. 14/633,009, dated Dec. 1, 2016, 7 pages.
"Second Written Opinion", Application No. PCT/US2016/016670, dated Nov. 18, 2016, 6 pages.
"Advanced Configuration and Power Interface", Retrieved from <http://www.acpi.info/> on Nov. 3, 2014, Jul. 23, 2014, 2 pages.
"Anker", Retrieved on: Aug. 13, 2015—Available at: http://www.ianker.com/ExternalBatteries/category-c1-s1, 9 pages.
"Anode active material for Lithium-ion-battery-Gramax", Retrieved from <http://www.ogc.co.jp/e/products/battery/> on Nov. 3, 2014, 2014, 2 pages.
"Anode Materials", Retrieved from <http://www.targray.com/li-ion-battery/anode-materials> on Nov. 3, 2014, Nov. 1, 2010, 2 pages.
"Arbin BT-2000 Battery Testing Equipment", Retrieved on: Aug. 13, 2015—Available at: http://www.arbin.com/products/battery, 2 pages.
"Battery and Power Subsystem Hardware Design", Retrieved From: <https://msdn.microsoft.com/en-us/library/windows/hardware/dn481323(v=vs.85).aspx> Aug. 5, 2015, Jun. 30, 2014, 4 pages.
"Battery Anodes", Retrieved on Sep. 23, 2015 Available at: http://www.emc2.cornell.edu/content/view/battery-anodes.html, 8 pages.
"Boltzmann Machines and Deep Belief Networks", Retrieved from <http://plearn.berlios.de/machine_learning/node4.html> on Jun. 22, 2009, 7 pages.
"Cell Trak", Retrieved from <http://celltraksystems.com/monitoring_parameters.html> on Nov. 4, 2014, Aug. 16, 2013, 4 pages.
"DS2782 Stand-Alone Fuel Gauge IC", Retrieved From: <http://www.maximintegrated.com/en/products/power/battery-management/DS2782.html/tb_tab0> Aug. 6, 2015, 3 pages.
"Final Office Action", U.S. Appl. No. 12/503,605, dated Sep. 20, 2012, 12 pages.
"Final Office Action", U.S. Appl. No. 13/530,130, dated Apr. 22, 2015, 7 pages.
"Ford Developers Look to Use Google Prediction API to Optimize Energy Efficiency", Retrieved from <http://corporate.ford.com/news-center/press-releases-detail/pr-ford-developers-look-to-use-google-34591> on Nov. 11, 2014, May 10, 2011, 1 page.
"Google Now", Retrieved on: Aug. 13, 2015—Available at: http://www.google.com/landing/now/, 1 page.
"Hey Siri, what's the Best Sushi Place in Town?", Retrieved on: Aug. 13, 2015—Available at: https://www.apple.com/ios/siri/, 5 pages.
"iFixit iPad Air 2 Teardown", Retrieved on: Aug. 13, 2015—Available at: https://www.ifixit.com/Teardown/iPad+Air+2+Teardown/30592, 12 pages.
"iFixit Microsoft Surface Pro 3 Teardown", Retrieved on: Aug. 13, 2015—Available at: https://www.ifixit.com/Teardown/Microsoft+Surface+Pro+3+Teardown/26595, 17 pages.
"iFixit Samsung Galaxy Note 10.1 Teardown", Retrieved on: Aug. 13, 2015—Available at: https://www.ifixit.com/Teardown/Samsung+Galaxy+Note+10.1+Teardown/10144, 13 pages.
"International Search Report and Written Opinion", Application No. PCT/US2015/026052, dated Jul. 23, 2015, 10 pages.
"MacBook", Retrieved on: Aug. 13, 2015—Available at: http://www.apple.com/macbook/design/, 14 pages.
"MACCOR—Model 4200", Retrieved on: Aug. 13, 2015—Available at: http://www.maccor.com/Products/Model4200.aspx, 2 pages.
"Maxim—Parametric Search Product Table", Retrieved on: Aug. 13, 2015—Available at: http://para.maximintegrated.com/en/results.mvp?fam=batt_stat295=Fuel%26nbsp%3BGauge&1379=ModelGauge, 2 pages.
"Mophie Juice Pack Helium", Retrieved on: Aug. 13, 2015—Available at: http://www.mophie.com/shop/iphone-5/juice-pack-helium-iphone-5, 7 pages.
"Non-Final Office Action", U.S. Appl. No. 12/503,605, dated Jan. 12, 2012, 11 pages.
"Non-Final Office Action", U.S. Appl. No. 12/503,605, dated Oct. 4, 2013, 14 pages.
"Non-Final Office Action", U.S. Appl. No. 13/530,130, dated Oct. 3, 2014, 8 pages.
"Notice of Allowance", U.S. Appl. No. 12/503,605, dated Jul. 23, 2014, 5 pages.
"Notice of Allowance", U.S. Appl. No. 13/530,130, dated Nov. 6, 2015, 5 pages.
"On-the-Go and Embedded Host Supplement to the USB Revision 2.0 Specification", Retrieved from <<http://www.usb.org/developers/onthego/USB_OTG_and_EH_2-0.pdf>> on Sep. 21, 2009, May 8, 2009, 79 pages.
"Qualcomm Quick Charge", Retrieved on: Aug. 13, 2015—Available at: https://www.qualcomm.com/products/snapdragon/quick-charge, 9 pages.
"Skoda Navigation", Retrieved from <https://skoda.garmin.com/skoda/site/productOverview> on Oct. 27, 2014, Jan. 23, 2014, 1 page.
"Surface Power Cover", Retrieved on: Aug. 13, 2015—Available at: http://www.microsoft.com/surface/en-us/support/hardware-and-drivers/power-cover?os=windows-10, 8 pages.
"The PASCAL Visual Object Classes Challenges 2008 (VOC2008) Results", Retrieved from <<http://pascallin.ecs.soton.ac.uk/challengesNOC/voc2008/results/index.shtml>> on Jun. 19, 2009, Jun. 22, 2009, 5 pages.
"Understanding Lithium-ion-Battery University", Retrieved on: Sep. 23, 2015 Available at: http://batteryuniversity.com/learn/article/understanding_lithium_ion, 8 pages.
Ackley,"A Learning Algorithm for Boltzmann Machines", Cognitive Science 9, pp. 147-169, 1985, 23 pages.
Albertus,"Experiments on and Modeling of Positive Electrodes with Multiple Active Materials for Lithium-Ion Batteries", In Journal of the Electrochemical Society, vol. 156, Issue 7, May 14, 2009, 1 page.
Allen,"Microfabricated Fast-Charging Energy Storage Devices", Retrieved from <http://yprize.upenn.edu/technology/fast-charging-batteries> on Nov. 3, 2014, 2014, 2 pages.
Balan,"The Case for Cyber Foraging", In Proceedings of the 10th workshop on ACM SIGOPS European Workshop, Jul. 2002, 6 pages.
Balasubramanian,"Energy Consumption in Mobile Phones: A Measurement Study and Implications for Network Applications", Proceedings of the 9th ACM SIGCOMM conference on Internet

(56) References Cited

OTHER PUBLICATIONS measurement conference (IMC), Retrieved at <<http://www.cs.umass.edu/-arunab/paper/tailender-imc09.pdf>>, Nov. 4, 2009, 14 Pages.
Banerjee,"Users and Batteries: Interactions and Adaptive Energy Management in Mobile Systems", In Proceedings of the 9th International Conference on Ubiquitous Computing, Sep. 2007, 18 pages.
Bashash,"Battery Health-conscious Plug-in Hybrid Electric Vehicle Grid Demand Prediction", In Proceedings of the ASME Dynamic Systems and Control Conference, Sep. 13, 2010, 9 pages.
Benini,"Battery-Driven Dynamic Power Management of Portable Systems", In Proceedings 13th International Symposium on System Synthesis, Sep. 20, 2000, 6 pages.
Benini,"Discharge Current Steering for Battery Lifetime Optimization", In Proceedings of the International Symposium on Low Power Electronics and Design, Aug. 12, 2002, pp. 118-123.
Benini,"Extending Lifetime of Portable Systems by Battery Scheduling", In Proceedings of the conference on Design, automation and test in Europe, Mar. 13, 2001, 5 pages.
Benini,"Scheduling Battery Usage in Mobile Systems", In IEEE Transactions on Very Large Scale Integration Systems, vol. 11, Issue 6, Dec. 2003, pp. 1136-1143.
Bickford,"Security versus Energy Tradeoffs in Host-Based Mobile Malware Detection", In Proceedings of 9th International Conference on Mobile Systems, Applications, and Services, Jun. 28, 2011, pp. 225-238.
Borkar,"Intel Look Inside", Available at: http://www.intel.com/content/dam/www/public/us/en/documents/presentation/advancing-moores-law-in-2014-presentation.pdf, Aug. 11, 2014, 68 pages.
Carroll,"An Analysis of Power Consumption in a Smartphone", In Proceedings of USENIX Annual Technical Conference, Jun. 23, 2010, 14 pages.
Chan,"A New Battery Model for use with Battery Energy Storage Systems and Electric Vehicles Power Systems", In IEEE Power Engineering Society Winter Meeting, vol. 1, Jan. 23, 2000, 6 pages.
Chang,"The State of Charge Estimating Methods for Battery: A Review", In Proceeding of the ISRN Applied Mathematics, May 12, 2013, 8 pages.
Chen,"An Accurate Electrical Battery Model Capable of Predicting Runtime and I-V Performance", In Proceeding of the IEEE Transactions on Energy Conversion, vol. 21, Issue 2, Jun. 5, 2006, 8 pages.
Chiasserini,"Energy Efficient Battery Management", In IEEE Journal on Selected Areas in Communications, vol. 19, Issue 7, Jul. 2001, pp. 1235-1245.
Chiasson,"Estimating the State of Charge of a Battery", In Proceedings of IEEE Transactions on Control Systems Technology, vol. 13, Issue 3, Apr. 25, 2005, 6 pages.
Chikkannanavara,"A Review of Blended Cathode Materials for Use in Li-Ion Batteries", In Journal of Power Sources, vol. 248, Feb. 15, 2015, 2 Pages.
Clark,"New Tech Allows Lithium Batteries to Charge Faster, and Hold Charge Longer", Available at: http://www.gizmag.com/lithium-batteries-charge-faster-hold-longer/20550/, Oct. 20, 2015, 8 pages.
Clark,"These solar-Powered Benches Charge Phones for Free", Retrieved from <http://www.wired.co.uk/news/archive/2014-07/09/soofa> on Nov. 3, 2014, Jul. 9, 2014, 4 pages.
Cosby,"Multiple battery chemistries, single device!", Retrieved From: <https://e2e.ti.com/blogs_/b/fullycharged/archive/2015/06/16/multiple-battery-chemistries-single-device> Aug. 6, 2015, Jun. 16, 2015, 3 pages.
Dong,"Self-Constructive High-Rate System Energy Modeling for Battery-Powered Mobile Systems", In Proceedings of the 9th international conference on Mobile systems, applications, and services, Jun. 28, 2011, 14 pages.
Erdinc,"A Dynamic Lithium-Ion Battery Model considering the Effects of Temperature and Capacity Fading", In Proceedings of International Conference on Clean Electrical Power, 060/9/2009, pp. 383-386.
Fairley,"Software Looks at the Road Ahead to Boost Hybrid-Car Efficiency", Retrieved from <http://spectrum.ieee.org/transportation/systems/software-looks-at-the-road-ahead-to-boost-hybridcar-efficiency> on Nov. 11, 2014, Feb. 3, 2009, 1 page.
Flinn,"Energy-Aware Adaptation for Mobile Applications", In Proceedings of the Seventeenth ACM Symposium on Operating Systems Principles, Dec. 1999, pp. 48-63.
Flinn,"Managing Battery Lifetime with Energy-Aware Adaptation", In Journal of ACM Transactions on Computer Systems, vol. 22, Issue 2, May 2004, 43 pages.
Fonseca,"Quanto: Tracking Energy in Networked Embedded Systems", In Proceedings of 8th USENIX Conference on Operating Systems Design and Implementation, Dec. 8, 2008, 16 pages.
Fox,"Automatic Construction of Efficient Multiple Battery Usage Policies", In Proceedings of the Twenty-Second International Joint Conference on Artificial Intelligence, Jun. 11, 2011, 6 pages.
Freund,"Unsupervised Learning of Distributions on Binary Vectors Using Two Layer Networks", Baskin Center for Computer Engineering & Information Sciences, University of California, Santa Cruz, UCSC-CRL-94-25, Jun. 22, 1994, 41 pages.
Gao,"Dynamic Lithium-Ion Battery Model for System Simulation", In Journal of IEEE Transactions on Components and Packaging Technologies, vol. 25, No. 3, Sep. 2002, pp. 495-505.
Gonder,"Route-Based Control of Hybrid Electric Vehicles", In SAE Technical Paper, Apr. 14, 2008, 11 pages.
Gong,"Trip Based Optimal Power Management of Plug-in Hybrid Electric Vehicle with Advanced Traffic Modeling", In SAE International Journal of Engines, Apr. 14, 2008, 1 page.
Gong,"Trip Based Optimal Power Management of Plug-in Hybrid Electric Vehicles Using Gas-Kinetic Traffic Flow Model", In Proceedings of American Control Conference, Jun. 11, 2008, 6 pages.
Groiß,"The Influence of Temperature on the Operation of Batteries and Other Electrochemical Energy Storage Systems", Retrieved from <http://www.basytec.de/Literatur/temperature/DE_2002.htm> on Nov. 3, 2014, Jan. 8, 2003, 7 pages.
Gu,"Thermal-Electrochemical Modeling of Battery Systems", In Journal of Electrochemical Society, Jan. 28, 2000, 41 pages.
Hayakawa,"Incentive Based Multi-Objective Optimization in Electric Vehicle Navigation including Battery Charging", In Proceedings of the International Federation of Automatic Control, Aug. 24, 2014, 7 pages.
He,"State-of-Charge Estimation of the Lithium-Ion Battery Using an Adaptive Extended Kalman Filter Based on an Improved Thevenin Model", In Proceedings of IEEE Transactions on Vehicular Technology, vol. 60, Issue 4, May 2011, pp. 1461-1469.
He,"Vehicle-Infrastructure Integration-Enabled Plug-in Hybrid Electric Vehicles for Optimizing Energy Consumption", In Transportation Research Board 90th Annual Meeting Compendium of Papers DVD, Jan. 23, 2011, 14 pages.
Heath,"Code Transformations for Energy Efficient Device Management", In Journal of IEEE Transactions on Computers, vol. 53, Issue 8, Aug. 2004, 37 pages.
Higgins,"Informed Mobile Prefetching", In Proceedings of the 10th international conference on Mobile systems, applications, and services, Jun. 25, 2012, pp. 155-168.
Hinton,"A Fast Learning Algorithm for Deep Belief Nets", Retrieved from <<http://www.cs.toronto.edu/-hinton/absps/fastnc.pdf>> on Jun. 19, 2009, 2006, 16 pages.
Johnson,"Temperature Dependent Battery Models for High-Power Lithium-Ion Batteries", In 17th Annual Electric Vehicle Symposium, Oct. 15, 2000, 17 pages.
Jongerden,"Lifetime Improvement by Battery Scheduling", In Proceedings of the 16th international GI/ITG conference on Measurement, Modelling, and Evaluation of Computing Systems and Dependability and Fault Tolerance, Mar. 19, 2012, 15 pages.
Jongerden,"Maximizing System Lifetime by Battery Scheduling", In Proceeding of the IEEE/IFIP International Conference on Dependable Systems & Networks, Jun. 29, 2009, 10 pages.

(56) References Cited

OTHER PUBLICATIONS

Katsargyri,"Optimally Controlling Hybrid Electric Vehicles using Path Forecasting", In Proceedings of American Control Conference, Jun. 10, 2009, 6 pages.

Keshav,"Energy efficient scheduling in 4G smart phones for Mobile Hotspot Application", In Proceedings: National Conference on Communications, Feb. 3, 2012, 5 Pages.

Kohli,"Robust Higher Order Potentials for Enforcing Label Consistency", Retrieved from <<http://research.microsoft.com/en-us/um/people/pkohli/papers/klt_ cvpr08. pdf>> on Jun. 19, 2009, 8 pages.

Korhonen,"Predicting Mobile Device Battery Life", In Master's Thesis, Feb. 28, 2011, 62 pages.

Koushanfar,"Hybrid Heterogeneous Energy Supply Networks", In IEEE International Symposium on Circuits and Systems, May 15, 2011, 4 pages.

Krumm,"Predestination: Inferring Destinations from Partial Trajectories", UbiComp 2006: The Eighth International Conference on Ubiquitous Computing, Sep. 17-21, 2006, Orange County, CA, retrieved from <http://research.microsoft.com/en-us/um/people/horvitzlpredestination.pdf> on Feb. 5, 2009, Sep. 17, 2006, 18 pages.

Krumm,"Predestination: Where Do You Want to Go Today?", In Journal of Computer, vol. 40, Issue 4, Apr. 2007, 4 pages.

Krumm,"Where Will They Turn: Predicting Turn Proportions at Intersections", In Journal of Personal and Ubiquitous Computing, vol. 14, Issue 7, Oct. 2010, 14 pages.

Kumar,"Discriminative Random Fields", International Journal of Computer Vision 68(2), 179-201, 2006, 23 pages.

Laasonen,"Adaptive On-Device Location Recognition", In Proceedings of the 2nd International Conference on Pervasive Computing, Researchers and Practitioners, Apr. 2004, pp. 287-304.

LaMarca,"Place Lab: Device Positioning Using Radio Beacons in the Wild", In Proceedings of Pervasive 2005, Munich, Germany, retrieved from <http://www.placelab.org/publications/pubs/pervasive-placelab-2005-final.pdf> on Feb. 5, 2009, May 2005, 18 pages.

Langari,"Intelligent Energy Management Agent for a Parallel Hybrid Vehicle—Part I: System Architecture and Design of the Driving Situation Identification Process", In IEEE Transactions on Vehicular Technology, vol. 54, Issue 3, May 23, 2005, 10 pages.

Larochelle,"An Empirical Evaluation of Deep Architectures on Problems with Many Factors of Variation", University of Montreal, CIAR Summer School, Aug. 9, 2007, 24 pages.

Lee,"Sparse Deep Belief Net Model for Visual Area V2", Computer Science Department, Stanford University, Retrieved from <<http://books.nips.cc/papers/files/nips20/NIPS20070934.pdf>> on Jun. 19, 2009, 8 pages.

Lu,"A Scalable and Programmable Architecture for the Continuous Restricted Boltzmann Machine in VLSI", The Department of Electrical Engineering, The National Tsing-Hua University, Taiwan, IEEE, 2007, pp. 1297-1300, 2007, 4 pages.

Mak,"Infrastructure Planning for Electric Vehicles with Battery Swapping", In Journal of Academic Science, vol. 59, Issue 7, Jul. 2013, 33 pages.

Man,"Towards a Hybrid Approach to SoC Estimation for a Smart Battery Management System (BMS) and Battery Supported Cyber-Physical Systems (CPS)", In Proceeding of the 2nd Baltic Congress on Future Internet Communications, Apr. 25, 2012, 4 pages.

Mandal,"IntellBatt: Towards Smarter Battery Design", In Proceedings of 45th ACM/IEEE Design Automation Conference, Jun. 8, 2008, 6 pages.

Miettinen,"Energy Efficiency of Mobile Clients in Cloud Computing", In Proceedings of the 2nd USENIX conference on Hot topics in cloud computing, Jun. 22, 2010, 7 pages.

Miliche,"A First Experimental Investigation of the Practical Efficiency of Battery Scheduling", In Proceedings of 23th International Conference on Architecture of Computing Systems,, Feb. 22, 2010, 6 pages.

MIT"Reality Commons", Retrieved from <http://realitycommons.media.mit.edu/> on Nov. 3, 2014, 2014, 2 pages.

Mittal,"Empowering Developers to Estimate App Energy Consumption", In Proceedings of the 18th annual international conference on Mobile computing and networking, Aug. 22, 2012, pp. 317-328.

Musardo,"A-ECMS: An Adaptive Algorithm for Hybrid Electric Vehicle Energy Management", In Proceedings of the 44th IEEE Conference on Decision and Control, and the European Control Conference, Dec. 12, 2005, 8 pages.

Osindero,"Modeling Image Patches with a Directed Hierarchy of Markov Random Fields", Retrieved from <<http://www.cs.toronto.edu/-hinton/absps/lateral.pdf>> on Jun. 19, 2009, 8 pages.

Panigrahi,"Battery Life Estimation of Mobile Embedded Systems", In Proceeding of the Fourteenth International Conference on VLSI Design, Jan. 2001, 7 pages.

Pathak,"Fine-Grained Power Modeling for Smartphones using System Call Tracing", In Proceedings of the sixth conference on Computer systems, Apr. 10, 2011, pp. 153-168.

Pathak,"Where is the Energy Spent Inside My App? Fine Grained Energy Accounting on Smartphones with Eprof", In Proceedings of the 7th ACM European conference on Computer Systems, Apr. 10, 2012, pp. 29-42.

Prigg,"Charged in 30 seconds: Israeli Firm Claims Battery Breakthrough that could Change the way we Power Phones and Laptops", Retrieved from <http://www.dailymail.co.uk/sciencetech/article-2599243/Charged-30-seconds-Israeli-firm-claims-battery-breakthrough-change-way-charge-phones-laptops.html> on Nov. 3, 2014, Apr. 7, 2014, 6 pages.

Qian,"Profiling Resource Usage for Mobile Applications: A Cross-layer Approach", In Proceedings of the 9th international conference on Mobile systems, applications, and services, Jun. 28, 2011, 14 pages.

Ranzato,"Sparse Feature Learning for Deep Belief Networks", Retrieved from <<http://yann.lecun.com/exdb/publis/pdf/ranzato-nips-07 .pdf>> on Jun. 19, 2009, 8 pages.

Rao,"Analysis of Discharge Techniques for Multiple Battery Systems", In Proceedings of the International Symposium on Low Power Electronics and Design, Aug. 25, 2003, pp. 44-47.

Rao,"Battery Modeling for Energy-Aware System Design", In Journal of Computer, vol. 36, Issue 12, Dec. 2012, 11 pages.

Ravi,"Context-aware Battery Management for Mobile Phones", Proceedings of the Sixth Annual IEEE International Conference on Pervasive Computing and Communications (PERCOM), Retrieved at <<http://www.cs.rutgers.edu/discolab/smartphone/papers/percom08.pdf>>, 2008, 10 Pages.

Ravi,"Context-aware Battery Management for Mobile Phones: A Feasibility Study", In Proceedings of IEEE International Conference on Pervasive Computing and Communications, 2006, 16 pages.

Richard,"Google's Prediction API Could Optimize Your Car's Fuel Efficiency", Retrieved from <http://www.treehugger.com/cars/googles-prediction-api-could-optimize-your-cars-fuel-efficiency.html> on Nov. 11, 2014, May 18, 2011, 3 pages.

Rong,"An Analytical Model for Predicting the Remaining Battery Capacity Prediction for Lithium-Ion Batteries", In Proceedings of the conference on Design, Automation and Test in Europe—vol. 1, Mar. 2003, 2 pages.

Ross,"A Systematic Approach to Learning Object Segmentation from Motion", MIT Computer Science and AI Laboratory, Retrieved from <<http://web.mit.edu/mgross/www/publications/mgrlpk-cvw-paper-03.pdf>> on Jun. 19, 2009, 8 pages.

Roth,"Fields of Experts: A Framework for Learning Image Priors", IEEE, Retrieved from <<http://ieeexplore.ieee.org/stamp/stamp.jsp?tp=&isnumber=31473&arnumber=1467533>> on Jun. 19, 2009, 8 pages.

Roy,"Energy Management in Mobile Devices with Cinder Operating System", In Proceedings of the sixth conference on Computer systems, 004/10/2011, pp. 139-152.

Sachenbacher,"Modeling and Optimization for Efficient Electrical Mobility: Challenges from the E-Tour Project", In Proceedings of First International Workshop on Constraint Reasoning and Optimization for Computational Sustainability, Sep. 20, 2009, 2 pages.

(56) References Cited

OTHER PUBLICATIONS

Sathiyanarayanan,"Maximization Battery Lifetime and Improving Efficiency", In Proceedings of International Conference on Devices, Circuits and Systems, Mar. 15, 2012, 4 pages.
Shanklin,"Samsung Gear Live vs. Gear 2", Available at: http://www.gizmag.com/samsung-gear-live-vs-gear-2-smartwatch-comparison/32775/, Jul. 1, 2014, 17 pages.
Shotton,"Semantic Texton Forests for Image Categorization and Segmentation", IEEE, Retrieved from <<http://ieeexplore.ieee.org/stamp/stamp.jsp?tp=&arnumber=4587503&isnumber=4587335>> on Jun. 19, 2009, 2008, 8 pages.
Shotton,"TextonBoost for Image Understanding: Multi-Class Object Recognition and Segmentation by Jointly Modeling Texture, Layout, and Context", Retrieved from <<http://johnwinn.org/Publications/papers/TextonBoost_IJCV2009.pdf>> on Jun. 19, 2009, Jul. 2, 2007, 30 pages.
Shye,"Into the wild: Studying real user activity patterns to guide power optimizations for mobile architectures", In Proceedings of 42nd Annual IEEE/ACM International Symposium on Microarchitecture,, Dec. 12, 2009, pp. 168-178.
Simpson,"Characteristics of Rechargeable Batteries", In Literature No. SNVA533, 2011, 12 pages.
Smolensky,"Information Processing in Dynamical Systems: Foundations of Harmony Theory", CU-CS-321-86, University of Colorado at Boulder, Department of Computer Science, Retrieved from, Feb. 1986, 55 pages.
Srinivasan,"This week in batteries (TWiB)", Available at: http://thisweekinbatteries.blogspot.in/2010_06_01_archive.html, Jun. 28, 2015, 4 pages.
Strommer,"NFC-enabled Wireless Charging", In Proceedings of the 4th International Workshop on Near Field Communication, Mar. 13, 2012, 6 pages.
Styler,"Active Management of a Heterogeneous Energy Store for Electric Vehicles", In IEEE Forum on Integrated and Sustainable Transportation System, Jun. 29, 2011, 6 pages.
Styler,"Active Management of a Heterogeneous Energy Store for Electric Vehicles", Retrieved from: <http://repository.cmu.edu/cgi/viewcontent.cgi?article=1845&context=robotics> on Jun. 29, 2011, 8 Pages.
Thiagarajan,"Who Killed My Battery: Analyzing Mobile Browser Energy Consumption", In Proceedings of the 21st international conference on World Wide Web, Apr. 16, 2012, pp. 41-50.
Tieleman,"Training Restricted Boltzmann Machines Using Approximations to the Likelihood Gradient", Proceedings of the 25th International Conference on Machine Learning, pp. 1064-1071, 2008, 8 pages.
Tu,"Image Parsing: Unifying Segmentation, Detection, and Recognition", Proceedings of the Ninth IEEE International Conference on Computer Vision (ICCV 2003) 2-Volume Set, 2003, 8 pages.
Tu,"Image Segmentation by Data-Driven Markov Chain Monte Carlo", IEEE Transactions on Pattern Analysis and Machine Intelligence, vol. 24, No. 5, pp. 657-673, May 2002, 17 pages.
Viswanathan,"Effect of Entropy Change of Lithium Intercalation on Cathodes and Anodes on Li-ion Battery Thermal Management", In Journal of Power Sources, vol. 195, Issue 11, Jun. 1, 2010, pp. 3720-3729.
Wagner,"Microsoft Planning 7-Day Phone Batteries", Retrieved from <http://www.lightreading.com/mobile/devices-smartphones/microsoft-planning-7-day-phone-batteries/d/d-id/709382> on Nov. 11, 2014, Jun. 10, 2014, 4 pages.
Wang,"Reducing Power Consumption for Mobile Platforms via Adaptive Traffic Coalescing", In IEEE Journal on Selected Areas in Communications, vol. 29, Issue 8, Sep. 2011, pp. 1618-1629.
Wen,"Online prediction of Battery Lifetime for Embedded and Mobile Devices", In Proceedings of the Third International Conference on Power-Aware Computer Systems, Dec. 1, 2003, 15 pages.
Wu,"An Interleaved Dual-Battery Power Supply for Battery-Operated Electronics", In Proceedings of the Asia and South Pacific Design Automation Conference, Jan. 28, 2001, pp. 387-390.
Xu,"Optimizing Background Email Sync on Smartphones", In Proceeding of the 11th Annual International Conference on Mobile Systems, Applications, and Services, Jun. 25, 2013, pp. 55-68.
Xu,"V-edge: Fast Self-constructive Power Modeling of Smartphones Based on Battery Voltage Dynamics", In Proceedings of the 10th USENIX conference on Networked Systems Design and Implementation, Apr. 2, 2013, 24 pages.
Yoon,"App-Scope: Application Energy Metering Framework for Android Smartphones using Kernel Activity Monitoring", In Proceedings of the USENIX conference on Annual Technical Conference, Jun. 15, 2012, 14 pages.
Zeng,"ECOSystem: Managing Energy as a First Class Operating System Resource", In Proceedings of ASPLOS 2002, Available at <http://www.cs.duke.edu/~vahdat/ps/ecosystem.pdf>, Oct. 2002, 10 pages.
Zhang,"Abstract—Cooperation Behavior between Heterogeneous Cations in Hybrid Batteries", In Journal of Chemical Communications, Issue 85, Aug. 22, 2013, 4 pages.
Zhang,"Accurate Online Power Estimation and Automatic Battery Behavior Based Power Model Generation for Smartphones", In Proceedings of the eighth IEEE/ACM/IFIP international conference on Hardware/software codesign and system synthesis, Oct. 24, 2010,, Oct. 24, 2010, pp. 105-114.
Zhang,"Modeling Discharge Behavior of Multicell Battery", In Proceeding of the IEEE Transactions on Energy Conversion, vol. 25, Issue 4, Dec. 2010, pp. 1133-1141.
Zheng,"Enhancing Battery Efficiency for Pervasive Health-Monitoring Systems Based on Electronic Textiles", In Proceedings of IEEE Transactions on Information Technology in Biomedicine, vol. 14, No. 2, Nov. 3, 2009, 10 pages.
Zhu,"A Stochastic Grammar of Images", Foundations and Trends in Computer Graphics and Vision, vol. 2, No. 4, pp. 259-362, 2006, 104 pages.
"International Search Report and Written Opinion", Application No. PCT/US2016/016037, dated Apr. 8, 2016, 10 pages.
"International Search Report and Written Opinion", Application No. PCT/US2016/016033, dated May 9, 2016, 10 pages.
"International Search Report and Written Opinion", Application No. PCT/US2016/016671, dated May 11, 2016, 10 pages.
"International Search Report and Written Opinion", Application No. PCT/US2016/015493, dated Apr. 4, 2016, 11 pages.
"International Search Report and Written Opinion", Application No. PCT/US2016/016034, dated Apr. 14, 2016, 16 pages.
"Corrected Notice of Allowance", U.S. Appl. No. 14/633,009, dated Jul. 28, 2017, 2 pages.
"International Preliminary Report on Patentability", Application No. PCT/US2016/016034, dated Aug. 4, 2017, 9 pages.
"Non-Final Office Action", U.S. Appl. No. 14/662,938, dated Aug. 9, 2017, 33 pages.
"Second Written Opinion", Application No. PCT/US2016/055238, dated Sep. 27, 2017, 6 pages.
"Corrected Notice of Allowance", U.S. Appl. No. 14/617,719, dated May 30, 2017, 2 pages.
"Corrected Notice of Allowance", U.S. Appl. No. 14/617,719, dated Jun. 8, 2017, 2 pages.
"Corrected Notice of Allowance", U.S. Appl. No. 14/633,009, dated Jun. 7, 2017, 4 pages.
"Final Office Action", U.S. Appl. No. 14/617,719, dated Dec. 12, 2016, 10 pages.
"Final Office Action", U.S. Appl. No. 14/617,751, dated Mar. 10, 2017, 11 pages.
"Final Office Action", U.S. Appl. No. 14/885,858, dated Jun. 9, 2017, 22 pages.
"International Preliminary Report on Patentability", Application No. PCT/US2016/016671, dated Feb. 22, 2017, 6 pages.
"International Preliminary Report on Patentability", Application No. PCT/US2016/015493, dated Apr. 21, 2017, 6 pages.
"International Preliminary Report on Patentability", Application No. PCT/US2016/016037, dated Nov. 24, 2016, 6 pages.
"International Preliminary Report on Patentability", Application No. PCT/US2016/016669, dated Mar. 10, 2017, 7 pages.
"International Preliminary Report on Patentability", Application No. PCT/US2016/016670, dated May 12, 2017, 7 pages.

(56) References Cited

OTHER PUBLICATIONS

"International Search Report and Written Opinion", Application No. PCT/US2016/055238, dated Jan. 19, 2017, 11 pages.
"International Search Report and Written Opinion", Application No. PCT/US2016/063741, dated Mar. 22, 2017, 13 pages.
"International Search Report and Written Opinion", Application No. PCT/US2016/060415, dated Feb. 22, 2017, 16 pages.
"Non-Final Office Action", U.S. Appl. No. 14/262,205, dated Dec. 23, 2016, 6 pages.
"Non-Final Office Action", U.S. Appl. No. 14/617,751, dated Jun. 30, 2017, 11 pages.
"Non-Final Office Action", U.S. Appl. No. 14/624,808, dated May 23, 2017, 5 pages.
"Non-Final Office Action", U.S. Appl. No. 14/626,518, dated Mar. 27, 2017, 24 pages.
"Non-Final Office Action", U.S. Appl. No. 14/626,600, dated Feb. 13, 2017, 27 pages.
"Non-Final Office Action", U.S. Appl. No. 14/941,416, dated May 17, 2017, 13 pages.
"Notice of Allowance", U.S. Appl. No. 14/262,205, dated May 31, 2017, 5 pages.
"Notice of Allowance", U.S. Appl. No. 14/617,719, dated Mar. 1, 2017, 5 pages.
"Notice of Allowance", U.S. Appl. No. 14/633,009, dated Apr. 18, 2017, 7 pages.
"Notice of Allowance", U.S. Appl. No. 14/959,265, dated Jun. 29, 2017, 5 pages.
"Restriction Requirement", U.S. Appl. No. 14/624,808, dated Feb. 23, 2017, 6 pages.
"Second Written Opinion", Application No. PCT/US2016/016034, dated Jan. 17, 2017, 8 pages.
"Non-Final Office Action", U.S. Appl. No. 14/959,265, dated Apr. 21, 2017, 8 pages.
"Final Office Action", U.S. Appl. No. 14/617,751, dated Feb. 5, 2018, 11 pages.
"Final Office Action", U.S. Appl. No. 14/617,751, dated Mar. 7, 2018, 12 pages.
"Final Office Action", U.S. Appl. No. 14/617,751, dated Feb. 13, 2018, 14 pages.
"Final Office Action", U.S. Appl. No. 14/626,518, dated Jan. 11, 2018, 37 pages.
"Final Office Action", U.S. Appl. No. 14/662,938, dated Feb. 21, 2018, 44 pages.
"Final Office Action", U.S. Appl. No. 14/624,808, dated Dec. 29, 2017, 6 pages.
"Final Office Action", U.S. Appl. No. 14/626,600, dated Nov. 16, 2017, 31 pages.
"Foreign Office Action", EP Application No. 15719556.1, dated Sep. 14, 2017, 4 pages.
"Second Written Opinion", Application No. PCT/US2016/063741, dated Sep. 29, 2017, 6 pages.
"Notice of Allowance", U.S. Appl. No. 14/941,416, dated Nov. 27, 2017, 7 pages.

* cited by examiner

SCHEDULE-BASED ENERGY STORAGE DEVICE SELECTION

BACKGROUND

As technology has advanced, mobile computing devices have become increasingly commonplace. Mobile computing devices provide various functionality to users, allowing the user to interact with the device to check email, surf the web, compose text messages, interact with applications, and so on. One challenge that faces developers of mobile computing devices is efficient power management and extension of battery life. For example, extended processing of tasks by processors at or near capacity may drain the device battery, causing the device to shut down. Various power management strategies may be applied to control processor and battery utilization generally at the expense of overall device performance. If power management implemented for a device fails to strike a good balance between performance and battery life, user dissatisfaction with the device and manufacturer may result.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more embodiments, in a computing device having multiple heterogeneous energy storage devices, usage behavior of the computing device is predicted over a period of time. Based on the predicted usage behavior of the computing device over the period of time, a predicted amount of energy use for each of multiple epochs in the period of time is determined. Based on the predicted amount of energy use for subsequent epochs of the multiple epochs relative to one or more threshold values, an energy ratio is determined and energy is drawn from the multiple heterogeneous energy storage devices in accordance with the determined energy ratio.

DETAILED DESCRIPTION

Overview

Schedule-based energy storage device selection is described for a device having an energy storage device system with heterogeneous energy storage devices, such as heterogeneous battery cells. The heterogeneous energy storage devices include two or more energy storage devices having various different characteristics such as different sizes, capacities, technologies, chemistries, shapes, state of charge (SOC), age, cycles, temperature, and so forth. These different characteristics result in different energy storage devices being better suited for different types of operation. For example, one energy storage device may be more efficient at providing larger amounts of energy over shorter amounts of time (e.g., during a video conference) and another energy storage device may be more efficient at providing smaller amounts of energy over longer amounts of time (e.g., while a device is in a low-power usage or energy saving mode).

The techniques discussed herein use information regarding a user's future scheduled usage (e.g., according to the user's calendar) and/or past usage of a computing device to predict future workload patterns for the computing device and reserve energy storage device capacities across multiple heterogeneous energy storage devices to improve efficiency of the energy storage devices. For example, if a user is expected to attend a video conference call later in the day (e.g., due to the video conference call being on the user's calendar), then energy in an energy storage device that is better capable of handling such a workload (providing power during the video conference call) more efficiently is preserved so that the energy is available when the video conference call occurs.

The techniques discussed herein enable distribution of a power workload across multiple different energy storage devices. Based on predicted future power workload of a computing device, different energy storage devices, or different amounts of energy from different energy storage devices, are used to power the computing device at various times. This allows energy to be preserved in a particular one or more energy storage devices so that the energy is available when subsequently needed, which further improves power usage, battery life, and overall computing device performance.

In the discussion that follows, a section titled "Operating Environment" is provided and describes one example environment in which one or more implementations can be employed. Following this, a section titled "Schedule-Based Energy storage device Selection System Details" describes example details and procedures in accordance with one or more implementations. Last, a section titled "Example System" describes example computing systems, components, and devices that can be utilized for one or more implementations of schedule-based energy storage device selection.

Operating Environment

Figure 1:
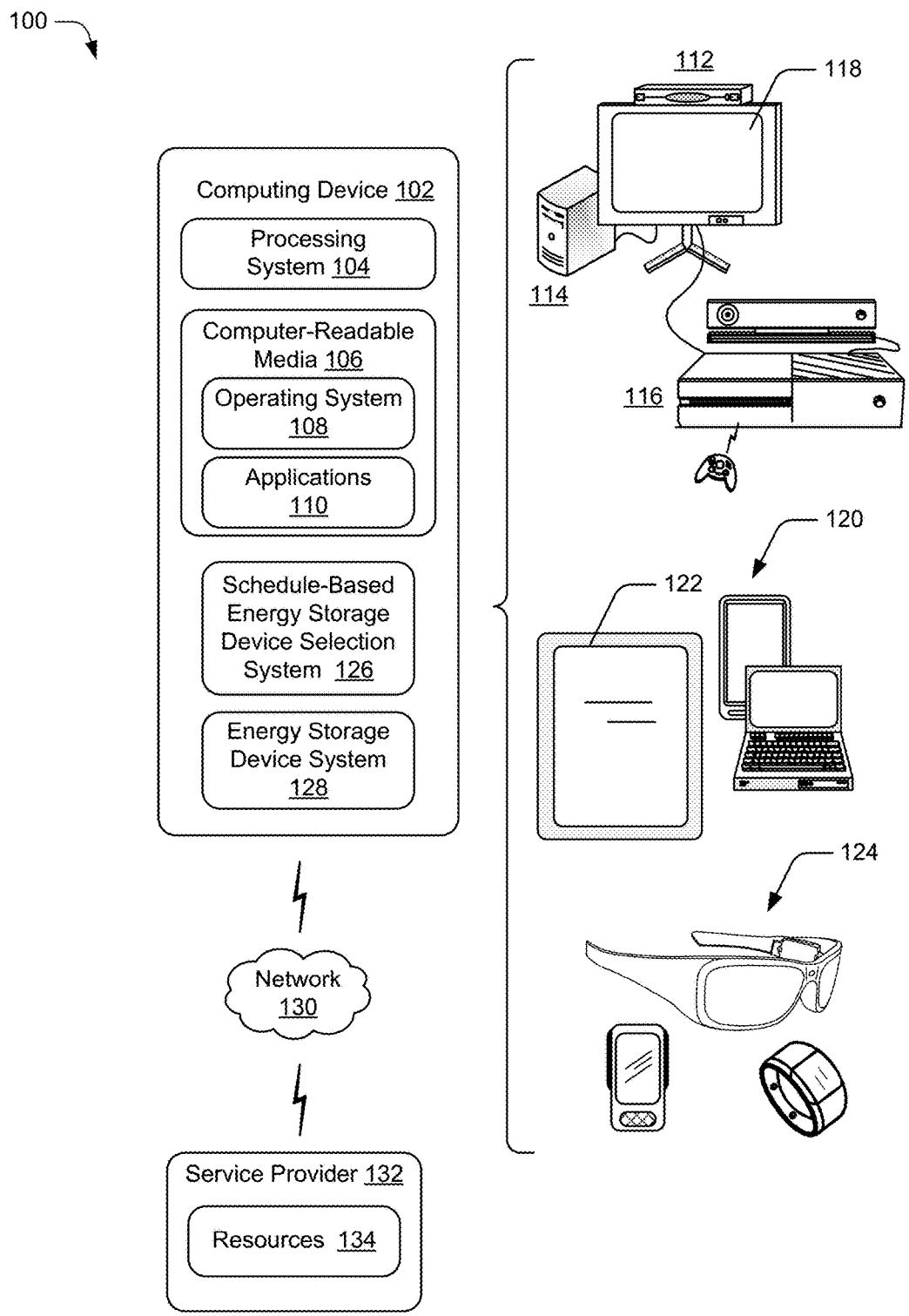
FIG. 1 illustrates an operating environment in accordance with one or more embodiments.

FIG. 1 illustrates an operating environment in accordance with one or more embodiments, generally at 100. The environment 100 includes a computing device 102 having a processing system 104 with one or more processors and devices (e.g., CPUs, GPUs, microcontrollers, hardware elements, fixed logic devices, etc.), one or more computer-readable media 106, an operating system 108, and one or more applications 110 that reside on the computer-readable media and which are executable by the processing system. The processing system 104 may be configured to include multiple independent processors configured in parallel or in series and one or more multi-core processing units. A multi-core processing unit may have two or more processors ("cores") included on the same chip or integrated circuit. In one or more implementations, the processing system 104 may include multiple processing cores that provide a range of performance capabilities, processing efficiencies, and power usage characteristics.

The processing system 104 may retrieve and execute computer-program instructions from applications 110 to provide a wide range of functionality to the computing device 102, including but not limited to gaming, office productivity, email, media management, printing, networking, web-browsing, and so forth. A variety of data and program files related to the applications 110 can also be included, examples of which include games files, office documents, multimedia files, emails, data files, web pages, user profile and/or preference data, and so forth.

The computing device 102 can be embodied as any suitable computing system and/or device such as, by way of example and not limitation, a gaming system, a desktop computer, a portable computer, a tablet or slate computer, a handheld computer such as a personal digital assistant (PDA), a cell phone, a set-top box, a wearable device (e.g., watch, band, glasses, etc.), and the like. For example, as shown in FIG. 1 the computing device 102 can be implemented as a television client device 112, a computer 114, and/or a gaming system 116 that is connected to a display device 118 to display media content. Alternatively, the computing device may be any type of portable computer, mobile phone, or portable device 120 that includes an integrated display 122. A computing device may also be configured as a wearable device 124 that is designed to be worn by, attached to, carried by, or otherwise transported by a user. Examples of wearable devices 124 depicted in FIG. 1 include glasses, a smart band or watch, and a pod device such as clip-on fitness device, media player, or tracker. Other examples of wearable devices 124 include but are not limited to badges, a key fob, an access card, and a ring, an article of clothing, a glove, or a bracelet, to name a few examples. Any of the computing devices can be implemented with various components, such as one or more processors and memory devices, as well as with any combination of differing components. One example of a computing system that can represent various systems and/or devices including the computing device 102 is shown and described below in relation to FIG. 7.

The computer-readable media can include, by way of example and not limitation, all forms of volatile and non-volatile memory and/or storage media that are typically associated with a computing device. Such media can include ROM, RAM, flash memory, hard disk, removable media and the like. Computer-readable media can include both "computer-readable storage media" and "communication media," examples of which can be found in the discussion of the example computing system of FIG. 7.

The computing device 102 may also include a schedule-based energy storage device selection system 126 and an energy storage device system 128 that operate as described above and below. The energy storage device system 128 is configured to include multiple heterogeneous energy storage devices as discussed in greater detail below. The schedule-based energy storage device selection system 126 and energy storage device system 128 may be provided using any suitable combination of hardware, software, firmware, and/or logic devices. As illustrated, the schedule-based energy storage device selection system 126 and energy storage device system 128 may be configured as separate, standalone systems. In addition or alternatively, the schedule-based energy storage device selection system 126 may also be configured as a system or module that is combined with the operating system 108 or implemented via a controller or other component of the energy storage device system 128.

The schedule-based energy storage device selection system 126 represents functionality operable to predict future workload patterns (also referred to herein as usage behavior) for the computing device 102 and manage heterogeneous energy storage devices of the energy storage device system 128 so as to reserve energy storage device capacities to improve efficiency of the energy storage devices. This may involve analyzing factors including but not limited to energy storage device characteristics, estimated or predicted future usage behavior of the computing device 102, estimated future energy usage of the computing device 102 over a given time period (e.g., a day), and so forth. The schedule-based energy storage device selection system 126 may manage the heterogeneous energy storage devices by controlling modes of the energy storage device system 128, states of battery cells or other energy storage devices of the energy storage device system 128, availability of energy storage devices of the energy storage device system 128, and so forth. For example, the schedule-based energy storage device selection system 126 is operable to communicate control signals or otherwise interact with the energy storage device system 128 to direct operation of switching hardware to switch between energy storage devices to service the load in accordance with the analysis performed by the schedule-based energy storage device selection system 126. Details regarding these and other aspects of schedule-based energy storage device selection are discussed in the following section.

The environment 100 further depicts that the computing device 102 may be communicatively coupled via a network 130 to a service provider 132, which enables the computing device 102 to access and interact with various resources 134 made available by the service provider 132. The resources 134 can include any suitable combination of content and/or services typically made available over a network by one or more service providers. For instance, content can include various combinations of text, video, ads, audio, multi-media streams, applications, animations, images, webpages, and the like. Some examples of services include, but are not limited to, an online computing service (e.g., "cloud" computing), an authentication service, web-based applications, a file storage and collaboration service, a search service, messaging services such as email and/or instant messaging, and a social networking service.

Having described an example operating environment, consider now example details and techniques associated with one or more implementations of schedule-based energy storage device selection.

Schedule-Based Energy Storage Device Selection System Details

To further illustrate, consider the discussion in this section of example devices, components, procedures, and implementation details that may be utilized to provide schedule-based energy storage device selection as described herein. In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Example Device

Figure 2:
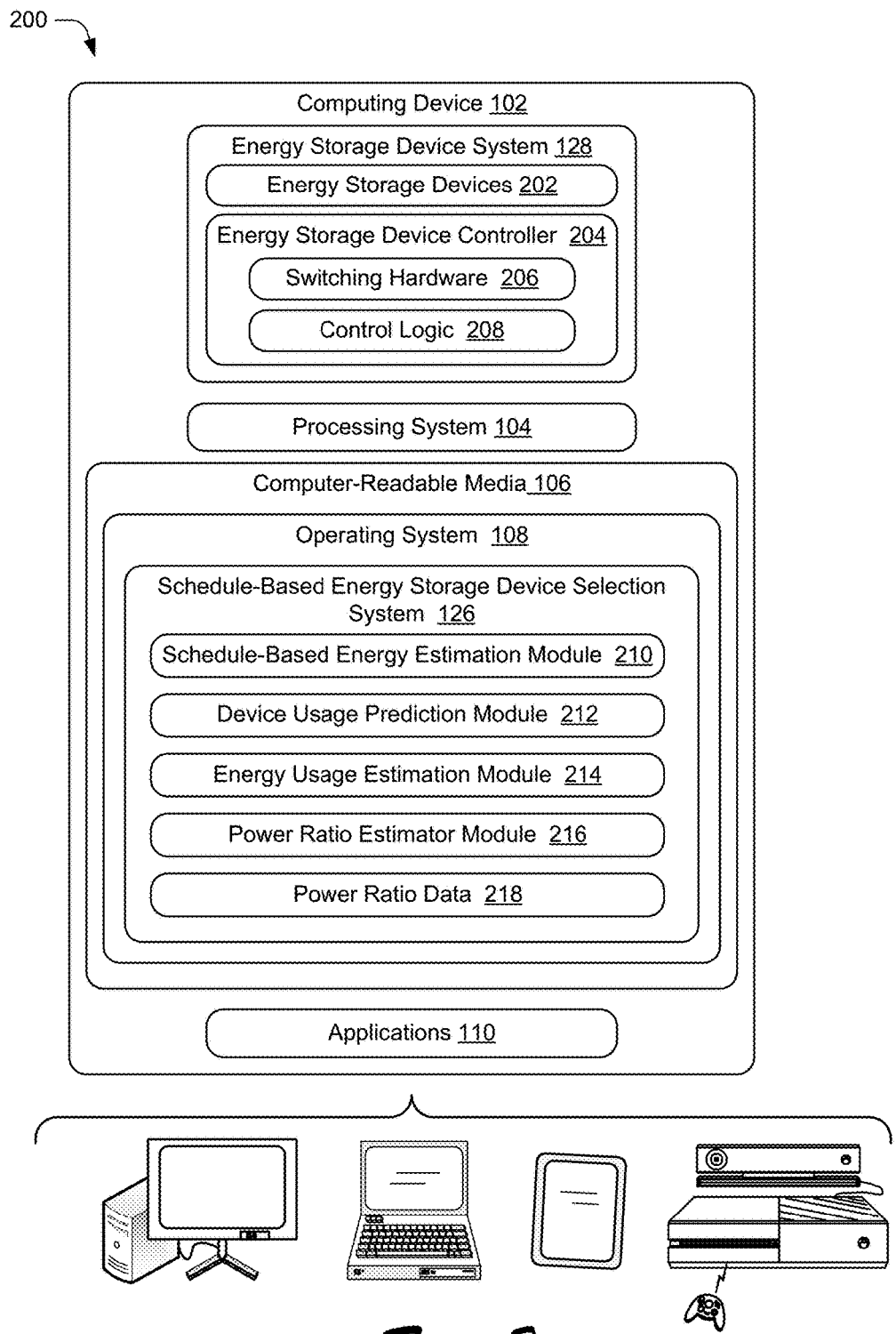
FIG. 2 depicts example details of a computing device having an energy storage device system with heterogeneous energy storage devices in accordance with one or more implementations.

FIG. 2 depicts generally at 200 example details of a computing device 102 having an energy storage device system 128 with heterogeneous energy storage devices in accordance with one or more implementations. Computing device 102 also includes processing system 104, computer readable media 106, operating system 108 and applications 110 as discussed in relation to FIG. 1. In the depicted example, a schedule-based energy storage device selection system module 126 is also shown as being implemented as a component of the operating system 108.

By way of example and not limitation, the energy storage device system 128 is depicted as having energy storage devices 202 and an energy storage device controller 204. The energy storage devices 202 are representative of various different kinds of energy storage devices that may be included with the computing device 102. These energy storage devices can include, for example, battery cells, supercapacitors, and so forth. It should be noted that these energy storage devices include various devices that store energy as opposed to being an external plug-in AC power source. As mentioned, energy storage devices 202 include energy storage devices having different characteristics such as different sizes/capacities, chemistries, battery technologies, shapes, state of charge (SOC), age, temperature, and so forth (heterogeneous energy storage devices). Accordingly, the energy storage device system 128 includes a diverse combination of multiple energy storage devices at least some of which have different characteristics one to another. However, it should be noted that some energy storage devices 202 may be the same and still be part of the energy storage device system 128 (e.g., the energy storage devices 202 may include three battery cells, two of which have the same characteristics and a third of which has one or more characteristics that are different than the first two battery cells). It should also be noted that energy storage devices may be heterogeneous despite sharing one or more characteristics (e.g., two battery cells may have the same capacities but have different battery technologies and different shapes). Various combinations of energy storage devices 202 may be utilized to provide a range of capacities, performance capabilities, efficiencies, and power usage characteristics.

The energy storage device controller 204 is representative of a control system to control operation of the energy storage device system 128 and delivery of power from the energy storage devices 202 to service a system load of the computing device 102. The system load refers to the energy required by the computing device 102 at any given point in time in order to operate. The energy storage device controller 204 may be configured using various logic, hardware, circuitry, firmware, and/or software suitable to connect the energy storage devices 202 one to another, supply power to the system, switch between the energy storage devices, and so forth. By way of example and not limitation, the energy storage device controller 204 in FIG. 2 is depicted as including switching hardware 206 and control logic 208 that is operable to selectively switch between use of different designated sources of the energy storage devices 202 at different times. Control logic 208 may reflect different switching modes that switch between drawing power from different ones of the energy storage devices 202 so that power is drawn from ones of the energy storage devices 202 in accordance with a particular power ratio as determined by the schedule-based energy storage device selection system 126. Thus, rather than merely interconnecting energy storage devices in parallel or series, switching hardware 206 can be utilized to set-up a switching scheme to select different energy storage devices based on different predicted future workload patterns for the computing device 102. Similarly, control logic 208 may reflect different switching modes that switch between providing power to different ones of the energy storage devices 202 to charge ones of the energy storage devices 202 in accordance with a particular power ratio as determined by the schedule-based energy storage device selection system 126.

In one approach, selection of an energy storage device 202 occurs under the influence of the schedule-based energy storage device selection system 126. As noted previously, the schedule-based energy storage device selection system 126 represents functionality operable to predict future workload patterns for the computing device 102 and manage the energy storage devices 202. The selection of an energy storage device 202 refers to selection of a particular one or more of the energy storage devices 202 and an amount of power that is to be drawn from the selected one or more energy storage devices. This selection of the amount of power that is to be drawn can be identified by a power ratio of one energy storage device to another. A power ratio of x:y can be used, where x refers to power drawn from a first energy storage device and y refers to power drawn from a second energy storage device. For example, a power ratio of 4:1 indicates that four times the amount of power is to be drawn from the first energy storage device than from the second energy storage device. Similar power ratios can be used in situations in which there are three or more energy storage devices, such as a power ratio x1:x2: . . . :xm, where x1 refers to power drawn from a first energy storage device, x2 refers to power drawn from a second energy storage device, and xm refers to power drawn from an mth energy storage device. For example, a power ratio of 4:2:1:1 indicates that: the amount of power to be drawn from the first energy storage device is twice the amount of power to be drawn from the second energy storage device and four times the amount of power to be drawn from each of the third and fourth energy storage devices, the amount of power to be drawn from the second energy storage device is twice the amount of power to be drawn from each of the third and fourth energy storage devices, and the amount of power to be drawn from the third energy storage device is the same as the amount of power to be drawn from the fourth energy storage device.

The schedule-based energy storage device selection system 126 includes a schedule-based energy estimation module 210, a device usage prediction module 212, an energy usage estimation module 214, a power ratio estimator module 216, and a power ratio data 218.

The schedule-based energy estimation module 210 represents functionality operable to predict (also referred to herein as estimate) the amount of energy the computing device 102 needs over the course of a given time period (e.g., a day), and performs such predicting based on information obtained from the device usage prediction module 212 and the energy usage estimation module 214. The power ratio estimator module 216 represents functionality to determine, based on the amount of energy predicted by the schedule-based energy estimation module 210, a power ratio for drawing power from the energy storage device 202. This power ratio is used by the control logic 208 to determine which energy storage device(s) to draw power from at any given time.

The device usage prediction module 212 represents functionality operable to predict usage behavior of the computing device 102 for a user. The usage behavior of the computing device 102 refers to the manner in which the computing device 102 is used. The device usage prediction module predicts usage behavior based on scheduled future usage behavior of the computing device and/or past usage behavior of the computing device. Scheduled future usage behavior refers to usage of the computing device that is scheduled or otherwise planned in a schedule or record for a user of the computing device. The schedule can be, for example, the user's calendar that identifies future meetings or appointments for the user. The user's calendar can identify different usage of the computing device 102, such as by indicating that the user has a teleconference scheduled in the future, indicating that the user has a video conference scheduled in the future, indicating that the user has a long-distance flight in the future, and so forth. This information can be used by the device usage prediction module 212 to predict usage behavior of the computing device 102, such as by predicting that the user will be using voice call functionality of the computing device 102 during times when the user has a teleconference scheduled, predicting that the user will be using video conference functionality of the computing device 102 during times when the user has a videoconference scheduled, predicting that the user will not be able to charge the computing device 102 during the long-distance flight, and so forth.

Past usage behavior of the computing device refers to how the computing device has been used in the past. Past usage behavior of the computing device can be determined in different manners. Various different information regarding the user's schedule can be analyzed to determine past usage behavior of the computing device, such as which applications 110 are run at which times of the day and on which days of the week, what power mode (e.g., a high power usage mode or a power saving mode) the computing device is in at which times of the day and on which days of the week, and so forth. This information can be monitored by various components or systems of the computing device 102 (e.g., with the user's permission), such as a digital assistant system of the computing device 102. This information can be used by the device usage prediction module 212 to predict usage behavior of the computing device 102, such as by determining that the user typically (e.g., at least a threshold amount of the time, such as 80% of the time) uses a particular application during particular times of particular days of the week. For example, the device usage prediction module 212 can determine that the user typically uses his or her video conferencing application from 5 pm-6 pm every Tuesday, and thus predict that the user will again use the video conferencing application from 5 pm-6 pm on the next Tuesday (regardless of whether a video conference call is reflected in the user's calendar). By way of another example, the device usage prediction module 212 can determine that the user typically uses his or her Global Positioning System (GPS) navigation system from 6 pm-7 pm every weekday (but not on weekends), and thus predict that the user will again use the GPS navigation system from 6 pm-7 pm on the next weekday. By way of yet another example, the device usage prediction module 212 can determine that the user always (e.g., at least a threshold amount of the time) has late-night meetings on Tuesday nights, which result in him or her running the battery very low before he or she returns home on Tuesdays (so, on Tuesdays, the computing device 102 should try as much as possible to conserve energy).

The energy usage estimation module 214 represents functionality operable to estimate how much energy is used for an application 110 and/or during particular time periods. The energy usage estimation module 214 can estimate how much energy is used by each individual application 110 when running, or for groups of applications 110. For example, applications can be grouped into classes or types of applications, such as video conferencing applications, GPS navigation applications, word processing applications, gaming applications, and so forth, and the amount of energy used by each group of applications can be estimated by the energy usage estimation module 214.

The energy used by an application can be estimated by the energy usage estimation module 214 in a variety of different manners. In one or more embodiments, the energy usage estimation module 214 monitors an amount of energy used by the application at times when the application is running and is the currently active (e.g., currently running) application. The amount of energy used when the application is running can be determined by monitoring an amount of power drawn from the energy storage devices 202, by checking a remaining capacity of the energy storage devices 202 both before and after running of the application (with the difference being the amount of energy used when the application is running), and so forth. Additionally or alternatively, the energy usage estimation module 214 can estimate the energy used by an application in other manners, such as by obtaining an indication of typical energy usage from a remote service or system (e.g., as provided by a developer of the computing device 102, as provided by a developer of the application itself, and so forth).

Additionally or alternatively, the energy usage estimation module 214 can estimate the amount of energy used during particular time periods (e.g., during every hour of the day, every twenty minutes, etc.). The amount of energy used during a time period can be determined in various manners, such as by monitoring an amount of power drawn from the energy storage devices 202 during the time period, by checking a remaining capacity of the energy storage devices 202 at the beginning and ending of the time period (with the difference being the amount of energy used when the application is running), and so forth.

The schedule-based energy estimation module 210 uses the information from the device usage prediction module 212 and the energy usage estimation module 214 to predict the amount of energy a user will use in each epoch over the course of a given time period. The time period can be, for example, a day, a particular 24-hour period (e.g., from 6 am to 6 am), a typical duration of a charge of the energy storage devices 202, and so forth. Each epoch is a duration of time that is smaller than the given time period, such as a few minutes, half an hour, an hour, and so forth. The duration of time in an epoch can vary by implementation, and can vary based on the granularity at which the device usage prediction module 212 is operable to predict usage behavior of the computing device 102. The finer the granularity the smaller the duration of time in the epoch. For example, if the device usage prediction module 212 is able to predict usage behavior for how much energy is used by the computing device during every 5-minute duration of time, then the epoch can be 5 minutes. However, if the device usage prediction 212 is only able to predict usage behavior of how much energy is used by the computing device during every 60-minute duration of time, then the epoch can be 60 minutes.

Given the information regarding predicted usage behavior of the computing device 102 from the device usage prediction module 212, and the estimated energy used by an application from the energy usage estimation module 214, the schedule-based energy estimation module 210 can readily predict the amount of energy a user will use in each epoch over the course of a given time period. For example, if a user is predicted to run a particular application from 3 pm-4 pm during the current day, then the amount of energy that will be used during the epochs in (e.g., included in or at least partially overlapping) the time range 3 pm-4 pm of the current day can be readily determined given the amount of energy that particular application is estimated to use. By way of another example, if past usage of the computing device 102 indicates that multiple different applications are running and that a particular amount of energy is typically used from 8:00 am-8:30 am every Saturday, then the amount of energy that will be used during the epochs in (e.g., included in or at least partially overlapping) the time range 8:00 am-8:30 am can be readily determined to be that particular amount of energy if the current day is Saturday.

The power ratio estimator module 216 represents functionality operable to use the information gathered and generated by the schedule-based energy estimation module 210 to determine the ratios in which power is to be drawn from the various energy storage devices in the energy storage device system 128. At any given time, the power ratio estimator module 216 combines (e.g., generates an average of) the estimated energy used in the computing device 102 in all (or at least a threshold number of) subsequent epochs remaining in the given time period. For example, at some point during the day the power ratio estimator module 216 averages the estimated energy used in the computing device 102 in all subsequent epochs remaining in the current day. The power ratio estimator module 216 uses this combined estimated energy used, combined with the power ratio data 218, to determine the current power ratio to use for the computing device 102. This determination can be made by the power ratio estimator module 216 at various regular or irregular intervals. For example, the power ratio estimator module 216 can make this determination every hour, after the amount of time in an epoch elapses (e.g., at the beginning of each epoch), and so forth.

The power ratio data 218 represents data used by the power ratio estimator module 216. The power ratio data 218 can be implemented as any of a variety of different data structures (e.g., a table, list, or other record), or as any of a variety of different formulas, rules, algorithms, and so forth. In one or more embodiments, the power ratio data 218 is a table of threshold values and corresponding power ratios. The power ratio estimator module 216 accesses the power ratio data 218, compares the combined estimated energy used as determined by the power ratio estimator module 216 to the threshold values in the power ratio data 218, and sets the power ratio for the computing device as the power ratio corresponding to the threshold values.

Table I illustrates an example table that can be used as power ratio data 218. It should be noted that the table illustrated in Table I is an example, and that other data structures, formulas, algorithms, and so forth can be used.

TABLE I

| Combined estimated energy used | Power Ratio |
| --- | --- |
| Below threshold 1 | Ratio 1 |
| Between threshold 1 and threshold 2 | Ratio 2 |
| Above threshold 2 | Ratio 3 |

Thus, as shown in Table I, three different power ratios are available, depending on the combined estimated energy used. Although only three power ratios and two threshold values (threshold 1 and threshold 2) are shown, any number of power ratios and threshold values can be used. For example, if the combined estimated energy used is below 1000 joule then a ratio of 2:1 may be used where 2 units of power are drawn from the first battery and 1 unit of power is drawn from the second battery for this epoch. If the combined estimated energy used is between 1000 to 2000 joule then a ratio of 1:1 may be used where 1 unit of power is drawn from the first battery and 1 unit of power is drawn from the second battery for this epoch. If the combined estimated energy used is above 2000 joule then a ratio of 1:2 may be used where 1 unit of power is drawn from the first battery and 2 units of power are drawn from the second battery for this epoch. In this example, the ratios and thresholds indicate that the first battery is better capable of handling higher power workloads therefore it may be beneficial to preserve it when the future epochs have higher estimated energy consumption.

The threshold values and power ratios in the power ratio data 218 can be determined in any of a variety of manners. By way of example, the threshold values and power ratios may be set by a designer or manufacturer of the computing device 102, may be set by the power ratio estimator module 216 using various rules or criteria, and so forth. In one or more embodiments, in setting the threshold values and power ratios in the power ratio data 218, multiple characteristics of the energy storage devices are taken into account including the capacities of the energy storage devices, the power capabilities of the energy storage devices, the lifetimes of the energy storage devices, and so forth. Some basic tenets used in determining the power ratios include preserving more efficient energy storage devices for future power intensive workloads, using less efficient energy storage devices for low-power workloads as much as possible, and calculating the power ratios for each threshold range such that for lower energy threshold values more power is drawn from the less efficient energy storage devices and vice-versa.

An algorithm or process can optionally be used to determine threshold values and power ratios in the power ratio data 218. Such an algorithm or process aims to, given an epoch size and the inefficiencies of each energy storage device, reduce the total energy wasted over a period of time (e.g., a day). For example, consider a day with just two epochs (12 hours during the day and 12 hours during the night). If it is known that the user spends 80% of the energy during the first epoch and 20% during the second epoch and it is also known that energy storage device #1 wastes 10% of energy whereas energy storage device #2 wastes 30% of energy then the ratios for the two epochs represented by r1:1-r1 and r2:1-r2 should be picked such that the value $((80*(r1*10+(1-r1)*30))+(20*(r2*10+(1-r2)*30)))$ which represents the total energy wasted is reduced (e.g., minimized). Note that such reduction or minimization problems can be readily solved using any of a variety of public and/or proprietary linear programming solvers.

The power ratio estimator module 216 can further optionally determine a power ratio for the energy storage devices based on the usage behavior predicted by the device usage prediction module 212. The scheduled future usage behavior and/or past usage behavior of the computing device 102 can include information regarding the availability of charging sources at different times, types of charging sources available at different times, and so forth. For example, if it is currently 1 pm and the past usage behavior indicates that a charging source is typically available to charge a first energy storage device of the multiple heterogeneous energy storage devices, but not a second energy storage device, from 2 pm-3 pm every weekday, then the power ratio estimator module 216 can select or set the power ratio so that power is drawn from the first energy storage device rather than the second energy storage device because it is known that the first energy storage device can be re-charged in the near future. By way of another example, if it is currently 10 am and the scheduled future usage behavior indicates that a scheduled meeting is held in a room known to have wireless charging that is able to charge a first energy storage device of the multiple heterogeneous energy storage devices, but not a second energy storage device, then the power ratio estimator module 216 can select or set the power ratio so that power is drawn from the first energy storage device rather than the second energy storage device because it is known that the first energy storage device can be re-charged in the near future.

The power ratio estimator module 216 provides the power ratio to the control logic 208. The control logic 208 controls which of the energy storage devices 202 are used at which times in accordance with the power ratio determined by the power ratio estimator module 216.

The schedule-based energy estimation system 126 is thus able to manage heterogeneous energy storage device capacities so that the epochs with higher energy consumption get most of their energy from batteries that are efficient at handling high power workloads while epochs with lower energy consumption get most of their energy from the remaining energy storage devices. The efficiency of the computing device 102 is thus increased as the workload of the computing device 102 is spread across the energy storage devices efficiently.

In the discussions herein, reference is made to using the power ratio for determining which energy storage device to draw power from at any given time. The techniques discussed herein can be analogously used to determine, when charging one or more of the energy storage devices 202, which energy storage device to charge at any given time. The power ratio determined by the power ratio estimator module 216 can be used to determine which energy storage devices are charged at which times, although the power ratio is reversed for charging energy storage devices. If there are two energy storage devices, and the power ratio estimator module 216 determines a power ratio of x:y, where x refers to power drawn from a first energy storage device (or provided to a second energy storage device when charging the energy storage devices 202) and y refers to power drawn from the second energy storage device (or provided to the first energy storage device when charging the energy storage devices 202). For example, a power ratio of 4:1 indicates that, when drawing power from the energy storage devices 202, four times the amount of power is to be drawn from the first energy storage device than the second energy storage device, and that when charging the energy storage devices 202 four times the amount of power is to be provided to the second energy storage device than the first energy storage device.

The schedule-based energy storage device selection system 126 can further select a mode for charging the energy storage devices based on the amount of energy a user is predicted to use in various epochs over the course of a given time period by the schedule-based energy estimation module 210. The charging mode for the energy storage devices can be selected so that there is sufficient power in the appropriate energy storage devices to satisfy the workload in subsequent epochs. For example, assume that an energy storage device is efficient at handling high power workloads and also supports two charging modes, one of which is a low-rate mode that charges the energy storage device at a lower rate that is less damaging to the lifespan of the energy storage device, and the other of which is a high-rate mode that charges the energy storage device at a higher rate that is more damaging to the lifespan of the energy storage device. If the predicted amount of energy in subsequent epochs of the given time period includes high power workloads (e.g., a video conference) and there is insufficient energy in the energy storage device to satisfy the high power workloads, then the energy storage device can be charged at the high-rate mode in order to give the energy storage device sufficient energy to satisfy the high power workloads. However, if the predicted amount of energy in subsequent epochs of the given time period includes no high power workloads (e.g., a video conference) or there is sufficient energy in the energy storage device to satisfy the high power workloads, then the energy storage device can be charged at the low-rate mode in order to extend the lifespan of the energy storage device.

By way of another example, assume that an energy storage device is efficient at handling high power workloads and also supports two charging modes, one of which is a low-rate mode that charges the energy storage device at a lower rate that is less damaging to the lifespan of the energy storage device, and the other of which is a high-rate mode that charges the energy storage device at a higher rate that is more damaging to the lifespan of the energy storage device. If the user is predicted to be on an airplane that is scheduled to leave in 30 minutes, then the energy storage device can be charged at the high-rate mode in order to give the energy storage device as much energy as possible before the user boards the airplane.

In the discussions herein, reference is made to power ratios. Additionally or alternatively, an energy ratio can be used, and in one or more embodiments a power ratio is an example of an energy ratio. An energy ratio identifies an amount of energy that is to be drawn from one energy storage device relative to one or more other energy storage devices. The energy ratio for a given epoch can be determined analogous to the discussions above for a power ratio, and the energy drawn from the energy storage devices during an epoch is as indicated in the energy ratio, but the power ratio can vary over the epoch. So, e.g., at any given instance in time the power drawn from a particular energy storage device may be zero (or close to (e.g., within a threshold amount of) zero), but the energy ratio for the epoch will remain the same. For example, an energy ratio of 4:1 for an epoch indicates that four times the amount of energy is to be drawn from a first energy storage device than from a second energy storage device for the epoch. The power ratio over the epoch may vary, such as being 8:1 at times, 2:1 at other times, or even including no (or almost no) energy being drawn from one of the two energy storage devices at some times during the epoch. However, taking into account the epoch as a whole, the amount of energy drawn from the first energy storage device is four times the amount of energy drawn from the second energy storage device for the epoch, regardless of how the power ratio may change during the epoch.

Example Battery Cell Arrangement

Generally speaking, an energy storage device system 128 having multiple diverse energy storage devices may be configured in various ways and employ a variety of different types of energy storage devices. In one or more implementations, different energy storage devices 202 included with a system have different characteristics, such as differences in one or more of battery chemistry, capacity, voltage, size, shapes and/or state of charge (SOC), to name a few examples. Using different types of energy storage devices provides flexibility for design of the energy storage device system and circuit boards, and consequently enables device developers to make better utilization of internal space to provide devices having increased battery life and efficiency. The different energy storage devices are arranged in a circuit that enables selective switching among the energy storage devices.

Figure 3:
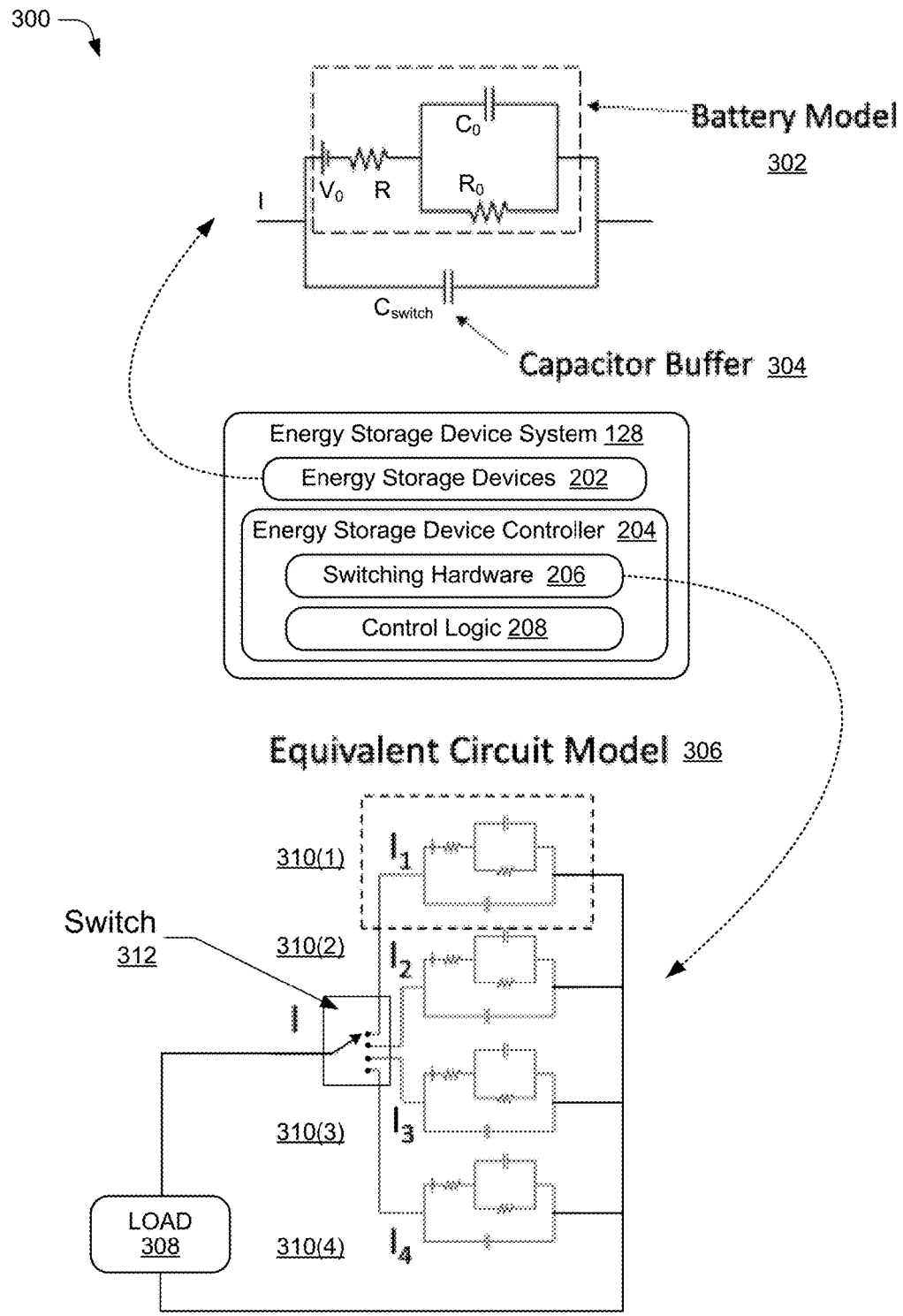
FIG. 3 depicts one illustrative example arrangement of an energy storage device system having multiple energy storage devices that are battery cells.

In particular, FIG. 3 depicts generally at 300 one illustrative example arrangement of an energy storage device system 128 having multiple energy storage devices 202 that are battery cells. The energy storage devices 202 may be connected in a circuit that includes an energy storage device controller 204 that implements switching hardware 206 and control logic 208 to switch back and forth among the energy storage devices 202.

Each of the energy storage devices 202 may be represented according to a battery model 302 an example of which is depicted in FIG. 3. Each of the battery cells may also be coupled to a capacitor buffer 304, which is provided to smooth out the supplied power when the switching hardware 206 is employed to switch between cells. Although one illustrative example of a battery model 302 is shown in FIG. 3, it is to be appreciated that the concepts described herein are not limited to a particular model and various different models may be utilized, individually or in combination. Generally, multiple energy storage devices 202 are arranged together with switching hardware 206 that enables switching between the energy storage devices. The switching circuit may also include a mechanism to smooth the current draw from different energy storage devices, such as the example capacitor buffer 304 or other smoothing components. Additionally, the switching circuit includes control logic 208 or comparable functionality to designate and control which of the energy storage devices are used to service the load, the mode of operation of the energy storage devices, and the amount of power that is drawn from each energy storage device. The control logic 208 controls the amount of power that is drawn from each energy storage device in accordance with the power ratio determined by the schedule-based energy storage device selection system 126.

The battery controller 204 and switching hardware 206 may be configured to support multiple different modes of operation for energy storage devices 202. In one mode, the switching hardware 206 is controlled to select one energy storage device at a time from which current is drawn to support the load. The particular energy storage device that is selected at any given time is dependent upon the determined power ratio.

In another mode, the switching hardware 206 is controlled to cycle rapidly between two or more different energy storage devices to draw a percentage of the overall load current from each energy storage device. In other words, the switching hardware 206 is cycled at a relatively high frequency to pull current from different energy storage devices according to the determined power ratio. Effectively, the rapid cycling in this mode enables servicing of the load by drawing different portions of load current from different cells at the same time. For example, for an energy storage device system having three cells and a determined power ratio of 7:2:1, seventy percent of the load may be drawn from a first energy storage device, twenty percent from a second energy storage device, and ten percent from a third energy storage device.

In yet another mode, the switching hardware 206 is controlled to cycle rapidly between or connect to two or more different energy storage devices to draw a specified amount of current at substantially the same time (e.g., simultaneously) from two or more energy storage devices being used to support the load. In this mode, the amount of current supplied by each energy storage device is designated as opposed to setting percentages or weight factors. Again, rapid cycling in this mode enables servicing of the load by drawing different portions of load current from different energy storage devices at the same time, but in this case within constraints for the amount of current that is supplied from each cell.

FIG. 3 further depicts an equivalent circuit model 306 for the energy storage device system 128. In particular, the equivalent circuit model 306 represents switching hardware 206 that can be used to provide current I to a load 308 using an arrangement of multiple battery energy storage devices 202. In the depicted example, four different battery cells 310(1)-310(4) are connectable to the load 308 via a switch 312. The switch 312 may be implemented as a solid state switch or other suitable hardware switching device. The example battery cells 310(1)-310(4) represent different heterogeneous batteries configured to provide respective amounts of current $I_1$, $I_2$, $I_3$, and $I_4$. The load current I may be supplied using one or a combination of the battery cells 310(1)-310(4). To do so, the switch 312 may be controlled via the control logic 208 to service the load in accordance with a determined power ratio as described previously. The switch 312 is also used to implement the various different switching modes described above and below. For instance the switch 312 may be positioned to select one of the battery cells 310(1)-310(4) and service the load via the selected cell. The switch 312 may also be cycled rapidly to different positions associated with different cells to effectively draw a portion of the overall current I at the same time from each battery. In this approach, the overall current I is supplied by summing the currents $I_1$, $I_2$, $I_3$, and $I_4$ supplied from each cell. (e.g., $I=I_1+I_2+I_3+I_4$). Portions of current obtained from each cell may be specified in various ways such as by associating percentages, weight factors, thresholds, or designated amounts with the cells.

Figure 4:
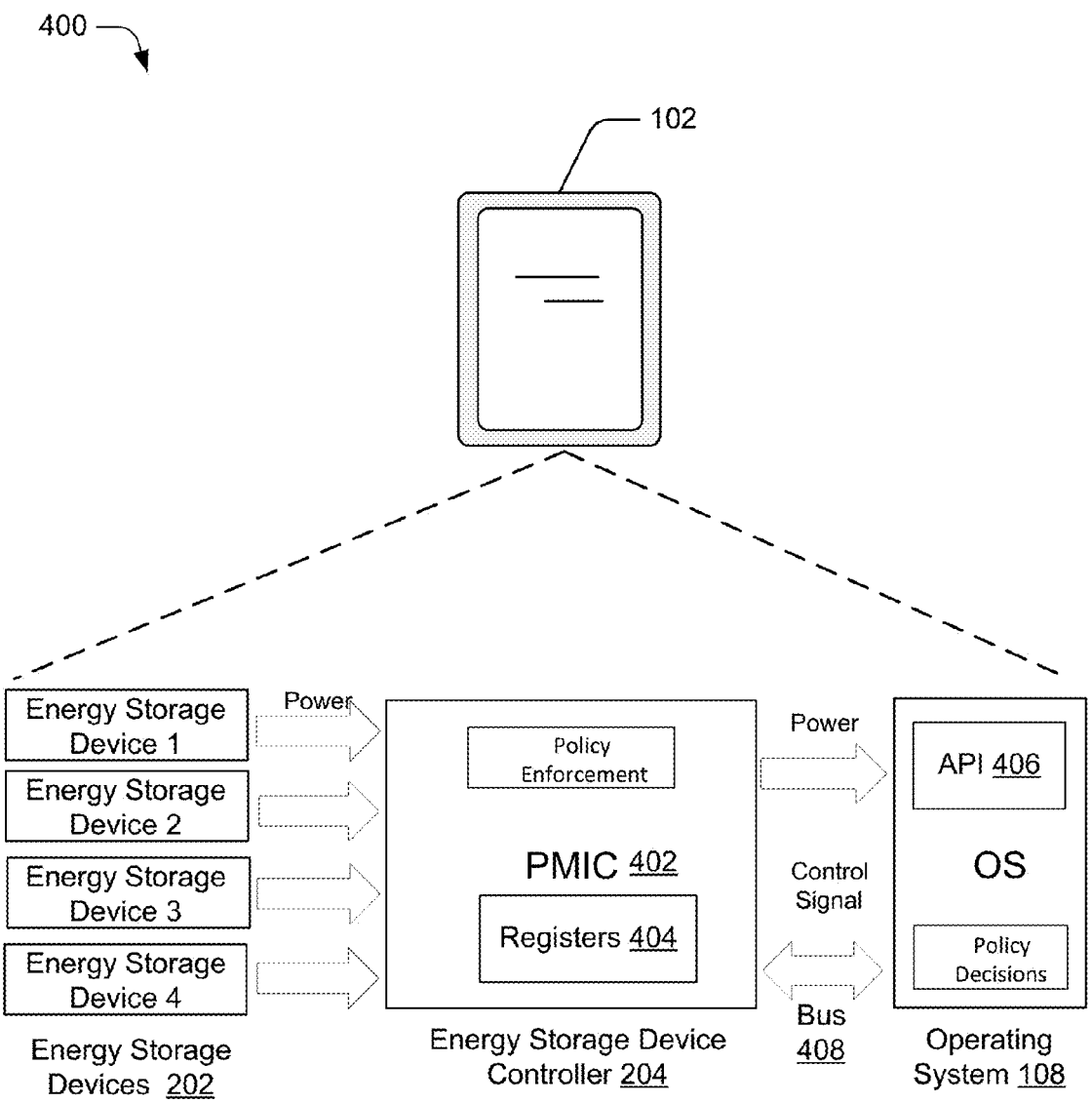
FIG. 4 depicts example details of a system having heterogeneous energy storage devices in accordance with one or more implementations.

FIG. 4 depicts generally at 400 example details of a system having heterogeneous energy storage devices in accordance with one or more implementations. In particular, the example of FIG. 4 depicts a system having energy storage devices 202 that may be integrated with a computing device 102. Power is supplied via the energy storage devices using the techniques discussed herein, such as via an energy storage device controller 204, which includes switching hardware 206 and control logic 208. In the depicted example, the energy storage device controller 204 is implemented via a power management integrated circuit (PMIC) 402 that is adapted to support heterogeneous energy storage device switching. For instance, in one or more implementations, the PMIC or other energy storage device controller is adapted to include registers 404 to facilitate policy enforcement of a switching policy. The registers 404 may be configured to hold various parameters that the control logic 208 makes use of to control operation of switching hardware 206 and supply power from the energy storage devices 206 accordingly. For example, registers 404 may include registers indicative of the determined power ratio, the switching policy, a selected switching mode, a timing register, and battery cell specific registers indicative of battery states, characteristics, and designated current switching constraints (amounts, weights, percentages, thresholds, etc.). Registers may be assigned default values selected for general usage in typical scenarios. Registers may then be selectively adapted under the influence of the operating system and/or user input to implement policy settings for different use cases.

The registers 404 implemented by the energy storage device controller are exposed to enable operating system 108 and/or application 110 level control over switching. In other words, the registers 404 provide user accessible control over heterogeneous energy storage device switching. By way of example and not limitation parameter values for the registers 404 may be set and updated dynamically via an application programming interface (API) 406 that is exposed via the operating system 108 as represented in FIG. 4. API messages and or other control signals may be exchanged between the energy storage device controller 204 and operating system over a suitable communication bus 408, one example of which is an I²C bus. Information regarding energy storage device states, workload, and characteristics of energy storage devices 202 may also be communicated to the operating system 108 and/or schedule-based energy storage device selection system 126 via the control signals and/or API to facilitate assessments of the operational context and policy decisions based on the operational context.

Thus, as represented in FIG. 4, the operating system 108, by way of a schedule-based energy storage device selection system 126 or otherwise, may make policy decisions such as mode selection and energy storage device constraints setting for energy storage device switching. Policy decisions are made based upon performance parameters indicative of an operational context including at least information regarding battery states and characteristics obtained from the battery controller 204. The API 406 provides a mechanism by which control signals are communicated to the energy storage device controller 204 to set the registers 404 in accordance with the policy decisions. Thus, the operating system 108 and/or schedule-based energy storage device selection system 126 may direct operation of energy storage device controller 204 to implement policy enforcement of a selected policy by setting the registers 404 and causing operation of switching hardware 206 to effectuate the modes and energy storage device constraints specified by the policy. Power is then supplied to the system via one or more of the battery cells in accordance with the policy decisions.

Example Procedures

Figure 5:
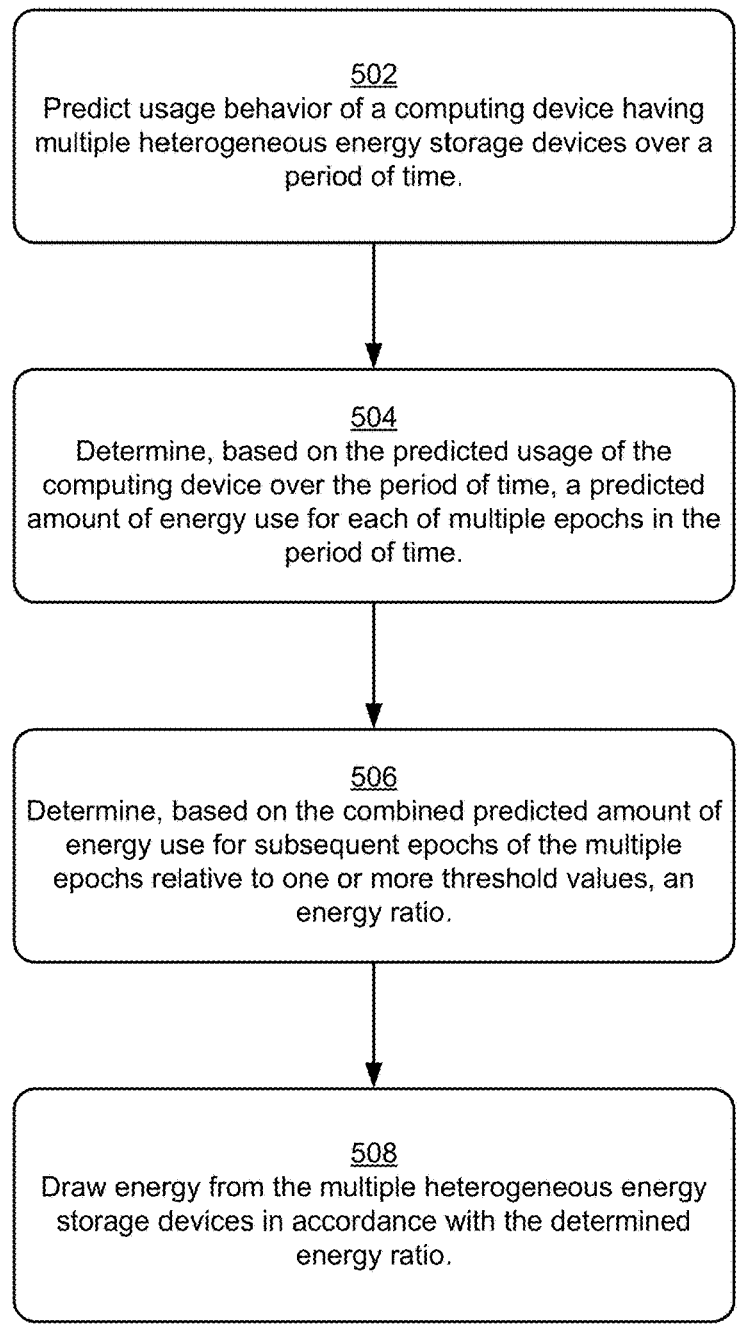
FIG. 5 is a flow diagram that describes details of an example procedure for schedule-based energy storage device selection in accordance with one or more implementations
Figure 6:
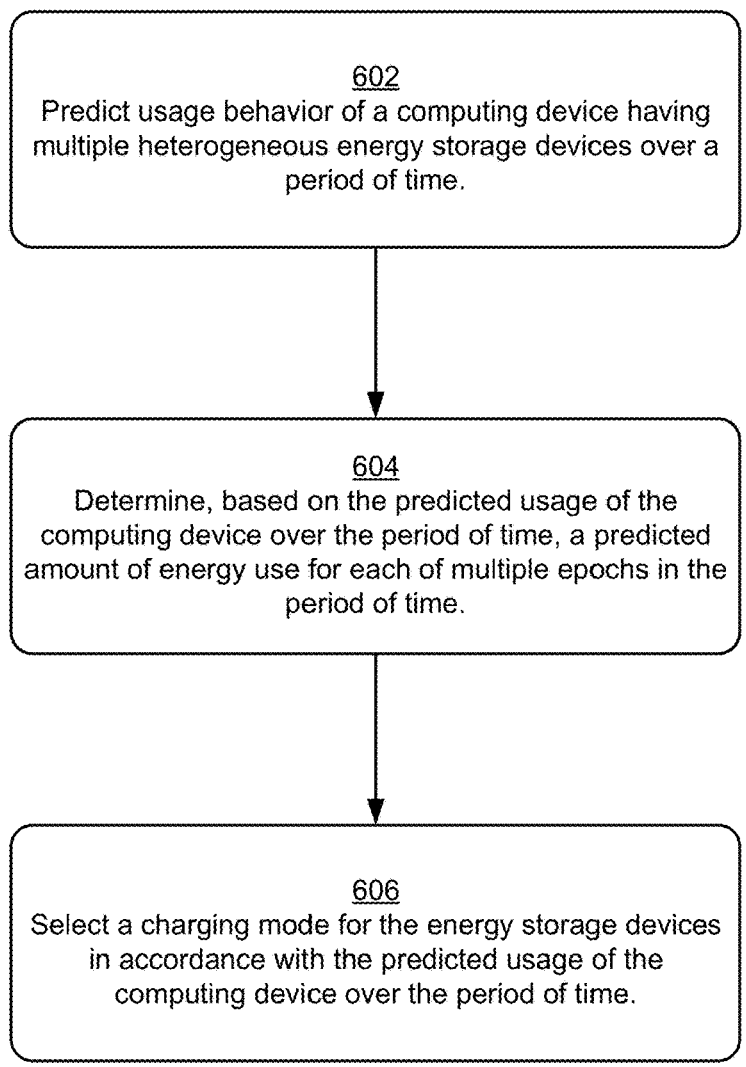
FIG. 6 is a flow diagram that describes details of another example procedure for schedule-based energy storage device selection in accordance with one or more implementations.

Further aspects of schedule-based energy storage device selection techniques are discussed in relation to example procedure of FIGS. 5 and 6. The procedures described in this document may be implemented utilizing the environment, system, devices, and components described herein and in connection with any suitable hardware, software, firmware, or combination thereof. The procedures may be represented as a set of blocks that specify operations performed by one or more entities and are not necessarily limited to the orders shown for performing the operations by the respective blocks.

FIG. 5 is a flow diagram that describes details of an example procedure 500 for schedule-based energy storage device selection in accordance with one or more implementations. The procedure 500 describes details of drawing power from multiple heterogeneous energy storage devices. The procedure 500 can be implemented by way of a suitably configured computing device, such as by way of an operating system 108, schedule-based energy storage device selection system 126, and/or other functionality described in relation to the examples of FIGS. 1-4.

Usage behavior of a computing device having multiple heterogeneous energy storage devices over a period of time is predicted (block 502). The usage behavior can be predicted based on based on past usage behavior of the computing device and/or scheduled future usage of the computing device usage as discussed above. The scheduled future usage of the computing device can be determined, for example, from a calendar that includes upcoming meetings or appointments for the user.

A predicted amount of energy use for each of multiple epochs in a period of time is determined based on the predicted usage of the computing device over the period of time (block 504). Each epoch is a duration of time that is less than the period of time, as discussed above. The predicted amount of energy use for an epoch is based on the predicted usage of the computing device during the epoch as well as which applications are running during that epoch and/or a particular time range for the epoch.

Based on the combined predicted amount of energy use for subsequent epochs of the multiple epochs relative to one or more threshold values, an energy ratio is determined (block 506). The predicted amount of energy use for subsequent epochs can be combined in various manners, such as averaged. The energy ratio can be, for example, a power ratio as discussed above.

Energy is drawn from the multiple heterogeneous energy storage devices in accordance with the determined energy ratio (block 508). The energy is drawn in accordance with the determined energy ratio so that epochs with higher energy consumption get most of their energy from energy storage devices that are efficient at handling high power workloads while epochs with lower energy consumption get most of their energy from the remaining energy storage devices.

FIG. 6 is a flow diagram that describes details of another example procedure 600 for schedule-based energy storage device selection in accordance with one or more implementations. The procedure 600 describes details of charging multiple heterogeneous energy storage devices. The procedure 600 can be implemented by way of a suitably configured computing device, such as by way of an operating system 108, schedule-based energy storage device selection system 126, and/or other functionality described in relation to the examples of FIGS. 1-4.

Usage behavior of a computing device having multiple heterogeneous energy storage devices over a period of time is predicted (block 602). The usage behavior can be predicted based on based on past usage behavior of the computing device and/or scheduled future usage of the computing device usage as discussed above. The scheduled future usage of the computing device can be determined, for example, from a calendar that includes upcoming meetings or appointments for the user.

A predicted amount of energy use for each of multiple epochs in a period of time is determined based on the predicted usage of the computing device over the period of time (block 604). Each epoch is a duration of time that is less than the period of time, as discussed above. The predicted amount of energy use for an epoch is based on the predicted usage of the computing device during the epoch as well as how much energy is used by applications in the computing device running during that epoch.

A charging mode for energy storage devices is selected in accordance with the predicted usage of the computing device over the period of time (block 606). The charging mode for the energy storage devices can be selected (e.g., from among a high-rate mode and a low-rate mode) so that there is sufficient power in the appropriate energy storage devices to satisfy the workload in subsequent epochs.

Example System

Figure 7:
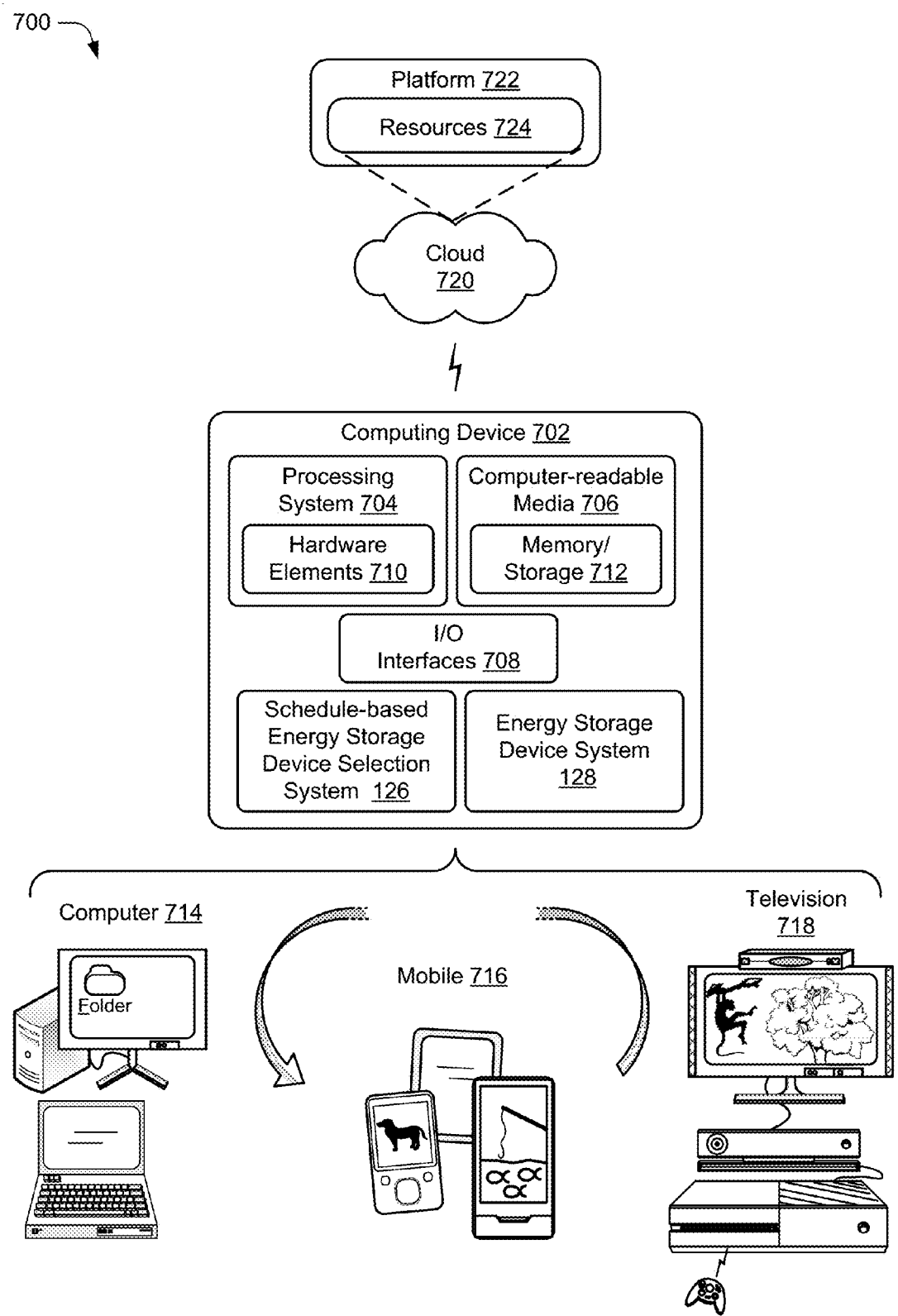
FIG. 7 illustrates an example system that includes an example computing device that is representative of one or more computing systems and/or devices that may implement the various techniques described herein.

FIG. 7 illustrates an example system 700 that includes an example computing device 702 that is representative of one or more computing systems and/or devices that may implement the various techniques described herein. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interfaces 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware elements 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 706 is illustrated as including memory/storage 712. The memory/storage 712 represents memory/storage capacity associated with one or more computer-readable media. The memory/storage 712 may include volatile media (such as random access memory (RAM)) and/or nonvolatile media (such as read only memory (ROM), Flash memory, optical disks, magnetic disks, and so forth). The memory/storage 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone for voice operations, a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "communication media."

"Computer-readable storage media" refers to media and/or devices that enable storage of information in contrast to mere signal transmission, carrier waves, or signals per se. Computer-readable storage media does not include signal bearing media, transitory signals, or signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Communication media" may refer to signal-bearing media that is configured to transmit instructions to the hardware of the computing device 702, such as via a network. Communication media typically may embody computer readable instructions, data structures, program modules, or other data in a modulated data signal, such as carrier waves, data signals, or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules including the operating system 108, applications 110, schedule-based energy storage device selection system 126, and other program modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of modules as a module that is executable by the computing device 702 as software may be achieved at least partially in hardware, e.g., through use of computer-readable storage media and/or hardware elements 710 of the processing system. The instructions and/or functions may be executable/operable by one or more articles of manufacture (for example, one or more computing devices 702 and/or processing systems 704) to implement techniques, modules, and examples described herein.

As further illustrated in FIG. 7, the example system 700 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 700, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 702 may assume a variety of different configurations, such as for computer 714, mobile 716, and television 718 uses. Each of these configurations includes devices that may have generally different constructs and capabilities, and thus the computing device 702 may be configured according to one or more of the different device classes. For instance, the computing device 702 may be implemented as the computer 714 class of a device that includes a personal computer, desktop computer, a multi-screen computer, laptop computer, netbook, and so on.

The computing device 702 may also be implemented as the mobile 716 class of device that includes mobile devices, such as a mobile phone, portable music player, portable gaming device, a tablet computer, a multi-screen computer, and so on. The computing device 702 may also be implemented as the television 718 class of device that includes devices having or connected to generally larger screens in casual viewing environments. These devices include televisions, set-top boxes, gaming consoles, and so on.

The techniques described herein may be supported by these various configurations of the computing device 702 and are not limited to the specific examples of the techniques described herein. This is illustrated through inclusion of the schedule-based energy storage device selection system 126 and the energy storage device system 128 on the computing device 702. The functionality represented by schedule-based energy storage device selection system 126 and other modules/applications may also be implemented all or in part through use of a distributed system, such as over a "cloud" 720 via a platform 722 as described below.

The cloud 720 includes and/or is representative of a platform 722 for resources 724. The platform 722 abstracts underlying functionality of hardware (e.g., servers) and software resources of the cloud 720. The resources 724 may include applications and/or data that can be utilized while computer processing is executed on servers that are remote from the computing device 702. Resources 724 can also include services provided over the Internet and/or through a subscriber network, such as a cellular or Wi-Fi network.

The platform 722 may abstract resources and functions to connect the computing device 702 with other computing devices. The platform 722 may also serve to abstract scaling of resources to provide a corresponding level of scale to encountered demand for the resources 724 that are implemented via the platform 722. Accordingly, in an interconnected device embodiment, implementation of functionality described herein may be distributed throughout the system 700. For example, the functionality may be implemented in part on the computing device 702 as well as via the platform 722 that abstracts the functionality of the cloud 720.

In the discussions herein, various different embodiments are described. It is to be appreciated and understood that each embodiment described herein can be used on its own or in connection with one or more other embodiments described herein. Further aspects of the techniques discussed herein relate to one or more of the following embodiments.

A method implemented in a computing device having multiple heterogeneous energy storage devices, the method comprising: predicting usage behavior of the computing device over a period of time; determining, based on the predicted usage behavior of the computing device over the period of time, a predicted amount of energy use for each of multiple epochs in the period of time; determining, based on the predicted amount of energy use for subsequent epochs of the multiple epochs relative to one or more threshold values, an energy ratio; and drawing energy from the multiple heterogeneous energy storage devices in accordance with the determined energy ratio.

Alternatively or in addition to any of the above described methods, any one or combination of: the predicting usage behavior comprising predicting the usage behavior of the computing device based on past usage behavior of the computing device; the predicting usage behavior comprising predicting the usage behavior of the computing device based on scheduled future usage behavior of the computing device; the scheduled future usage behavior of the computing device comprising at least one future meeting or appointment of a user of the computing device as indicated in a calendar of the user; the predicted amount of energy use comprising an average predicted amount of energy use for subsequent epochs of the multiple epochs; the energy ratio comprising a ratio indicating an amount of power to draw from a first of the multiple heterogeneous energy storage devices relative to a second of the multiple heterogeneous energy storage devices; the multiple heterogeneous energy storage devices comprising multiple heterogeneous battery cells; the period of time comprising a day; the method further comprising selecting a charging mode for at least one of the multiple heterogeneous energy storage devices based on the predicted usage behavior of the computing device over the period of time.

A computing device comprising: an energy storage device system including multiple heterogeneous energy storage devices; and an energy storage device selection system configured to communicate, to the energy storage device system, an energy ratio for drawing energy from ones of the multiple heterogeneous energy storage devices, the energy storage device selection system including: a device usage prediction module configured to predict usage behavior of the computing device over a period of time; an estimation module configured to determine, based on the predicted usage behavior of the computing device over the period of time, a predicted amount of energy use for each of multiple epochs in the period of time; and a power ratio estimator module configured to determine the energy ratio based on the predicted amount of energy use for each of the multiple epochs in the period of time, the energy ratio indicating an amount of energy to draw from one of the multiple heterogeneous energy storage devices relative to the other of the multiple heterogeneous energy storage devices.

Alternatively or in addition to any of the above described computing devices, any one or combination of the predicted usage behavior comprising usage behavior of the computing device predicted based on past usage behavior of the computing device, the predicted usage behavior comprising usage behavior of the computing device predicted based on scheduled future usage behavior of the computing device, the multiple heterogeneous energy storage devices comprising multiple heterogeneous battery cells, the energy storage device selection system being further configured to select a charging mode for at least one of the multiple heterogeneous energy storage devices based on the predicted usage behavior of the computing device over the period of time, the predicted amount of energy use comprising an average predicted amount of energy use for subsequent epochs of the multiple epochs.

A computing device comprising: an energy storage device system including multiple heterogeneous energy storage devices; one or more processors; and one or more computer-readable storage media having stored thereon multiple instructions that, responsive to execution by the one or more processors, cause the one or more processors to perform acts including: predicting usage behavior of the computing device over a period of time; determining, based on the predicted usage of the computing device over the period of time, a predicted amount of energy use for each of multiple epochs in the period of time; determining, based on the predicted amount of energy use for subsequent epochs of the multiple epochs, an energy ratio indicating an amount of energy to draw from one of the multiple heterogeneous energy storage devices relative to the other of the multiple heterogeneous energy storage devices for one of the multiple epochs; and communicating an indication of the energy ratio to the energy storage device system for the energy storage device system to draw energy from the multiple heterogeneous energy storage devices during the one epoch in accordance with the energy ratio.

Alternatively or in addition to any of the above described computing devices, any one or combination of: the predicted usage behavior comprising usage behavior of the computing device predicted based on past usage behavior of the computing device; the predicted usage behavior comprising usage behavior of the computing device predicted based on scheduled future usage behavior of the computing device; the energy ratio comprising a power ratio; the acts further comprising selecting a charging mode for at least one of the multiple heterogeneous energy storage devices based on the predicted usage behavior of the computing device over the period of time.

CONCLUSION

Although the example implementations have been described in language specific to structural features and/or methodological acts, it is to be understood that the implementations defined in the appended claims are not necessarily limited to the specific features or acts described. Rather, the specific features and acts are disclosed as example forms of implementing the claimed features.

What is claimed is:
1. A method implemented in a computing device having multiple heterogeneous energy storage devices, the method comprising:
   predicting usage behavior of the computing device over a period of time;
   determining, based on the predicted usage behavior of the computing device over the period of time, a predicted amount of energy use for each of multiple epochs in the period of time;
   determining, based on the predicted amount of energy use for subsequent epochs of the multiple epochs relative to one or more threshold values, an energy ratio, the energy ratio indicating an amount of energy to draw from one of the multiple heterogeneous energy storage devices relative to at least one other of the multiple heterogeneous energy storage devices; and
   drawing energy, during each of the multiple epochs, from each of the multiple heterogeneous energy storage devices in accordance with the determined energy ratio for the epoch.

2. The method of claim 1, the predicting usage behavior comprising predicting the usage behavior of the computing device based on past usage behavior of the computing device.

3. The method of claim 1, the predicting usage behavior comprising predicting the usage behavior of the computing device based on scheduled future usage behavior of the computing device.

4. The method of claim 3, the scheduled future usage behavior of the computing device comprising at least one future meeting or appointment of a user of the computing device as indicated in a calendar of the user.

5. The method of claim 1, the period of time comprising a day.

6. The method of claim 1, further comprising selecting a charging mode for at least one of the multiple heterogeneous energy storage devices based on the predicted usage behavior of the computing device over the period of time.

7. The method of claim 1, the drawing energy during an epoch comprising drawing energy from each of the multiple heterogeneous energy storage devices simultaneously during the epoch.

8. The method of claim 1, the drawing energy during an epoch comprising cycling between the multiple heterogeneous energy storage devices during the epoch.

9. The method of claim 1, the determining the energy ratio for an epoch comprising using a first energy ratio in response to the predicted amount of energy being less than a first threshold amount, using a second energy ratio in response to the predicted amount of energy being greater than a second threshold amount, and using a third energy ratio in response to the predicted amount of energy being between the first threshold amount and the second threshold amount, the first threshold amount and the second threshold amount being different amounts, and the first energy ratio, the second energy ratio, and the third energy ratio being different energy ratios.

10. A computing device comprising:
    an energy storage device system including multiple heterogeneous energy storage devices;
    an energy storage device selection system configured to communicate, to the energy storage device system, an energy ratio for drawing energy from ones of the multiple heterogeneous energy storage devices, the energy storage device selection system including:
        a device usage prediction module configured to predict usage behavior of the computing device over a period of time;
        an estimation module configured to determine, based on the predicted usage behavior of the computing device over the period of time, a predicted amount of energy use for each of multiple epochs in the period of time; and
        a power ratio estimator module configured to determine the energy ratio based on the predicted amount of energy use for each of the multiple epochs in the period of time, the energy ratio indicating an amount of energy to draw from each of the multiple heterogeneous energy storage devices relative to at least one other of the multiple heterogeneous energy storage devices during each of the multiple epochs in the period of time; and
    the energy storage device system further configured to draw energy, during each of the multiple epochs in the period of time, from each of the multiple heterogeneous energy storage devices in accordance with the energy ratio for the epoch.

11. The computing device of claim 10, the predicted usage behavior comprising usage behavior of the computing device predicted based on past usage behavior of the computing device.

12. The computing device of claim 10, the predicted usage behavior comprising usage behavior of the computing device predicted based on scheduled future usage behavior of the computing device.

13. The computing device of claim 10, the multiple heterogeneous energy storage devices comprising multiple heterogeneous battery cells.

14. The computing device of claim 10, the energy storage device selection system being further configured to select a charging mode for at least one of the multiple heterogeneous energy storage devices based on the predicted usage behavior of the computing device over the period of time.

15. The computing device of claim 10, the predicted amount of energy use comprising an average predicted amount of energy use for subsequent epochs of the multiple epochs.

16. A computing device comprising:
    an energy storage device system including multiple heterogeneous energy storage devices;
    one or more processors; and
    one or more computer-readable storage media having stored thereon multiple instructions that, responsive to execution by the one or more processors, cause the one or more processors to perform acts including:
        predicting usage behavior of the computing device over a period of time;
        determining, based on the predicted usage of the computing device over the period of time, a predicted amount of energy use for each of multiple epochs in the period of time;
        determining, based on the predicted amount of energy use for subsequent epochs of the multiple epochs, an energy ratio indicating an amount of energy to draw from one of the multiple heterogeneous energy storage devices relative to at least one other of the multiple heterogeneous energy storage devices for each of the multiple epochs; and
        communicating an indication of the energy ratio to the energy storage device system for the energy storage device system to draw energy from each of the multiple heterogeneous energy storage devices during each of the multiple epochs in accordance with the energy ratio.

17. The computing device of claim 16, the predicted usage behavior comprising usage behavior of the computing device predicted based on past usage behavior of the computing device.

18. The computing device of claim 16, the predicted usage behavior comprising usage behavior of the computing device predicted based on scheduled future usage behavior of the computing device.

19. The computing device of claim 16, the energy ratio comprising a power ratio.

20. The computing device of claim 16, the acts further comprising selecting a charging mode for at least one of the multiple heterogeneous energy storage devices based on the predicted usage behavior of the computing device over the period of time.

* * * * *